US012224591B2

(12) United States Patent
Hart et al.

(10) Patent No.: US 12,224,591 B2
(45) Date of Patent: Feb. 11, 2025

(54) VIRTUAL IMPEDANCE CURRENT LIMITING CONTROL FOR GRID FORMING INVERTER-BASED RESOURCES

(71) Applicant: General Electric Company, Schenectady, NY (US)

(72) Inventors: Philip Joseph Hart, Rexford, NY (US); Maozhong Gong, Latham, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 298 days.

(21) Appl. No.: 17/744,944

(22) Filed: May 16, 2022

(65) Prior Publication Data
US 2023/0369865 A1 Nov. 16, 2023

(51) Int. Cl.
*H02J 3/38* (2006.01)
*H02J 3/00* (2006.01)

(52) U.S. Cl.
CPC .............. *H02J 3/381* (2013.01); *H02J 3/001* (2020.01); *H02J 2300/28* (2020.01)

(58) Field of Classification Search
CPC ................................. H02J 3/001; H02J 3/381
See application file for complete search history.

(56) References Cited

U.S. PATENT DOCUMENTS 4,665,474 A * 5/1987 Neupauer ............. H02M 1/084
363/51
5,798,633 A 8/1998 Larsen et al.
(Continued)

FOREIGN PATENT DOCUMENTS

| CN | 112928938 A | 6/2021 |
| JP | 6523446 B2 | 5/2019 |
| WO | WO2021/145877 A1 | 7/2021 |

OTHER PUBLICATIONS

Andrade et al., Study of Large-Signal Stability of an Inverter-Based Generator Using a Lyapunov Function, 40$^{th}$ Annual Conference of the IEEE Industrial Electronics Society, 2014, pp. 1840-1846. (Abstract Only) https://ieeexplore.ieee.org/document/7048752.
(Continued)

*Primary Examiner* — Peter M Novak
(74) *Attorney, Agent, or Firm* — Dority & Manning, P.A.

(57) ABSTRACT

A method for controlling an inverter-based resource (IBR) connected to a power grid during a grid event includes operating the IBR based on a first virtual impedance reference prior to the grid event, the first virtual impedance reference being used for determining a first virtual impedance of the IBR defining a first virtual reactance and a first virtual resistance. The method also includes receiving an indication of a start of the grid event that causes a change in the first virtual impedance reference to a second virtual impedance reference. Immediately after the change in the first virtual impedance reference, the method includes activating a soft activation module for outputting a second virtual impedance defining a second virtual reactance and a second virtual resistance that maintains a magnitude of the second virtual impedance at or above a magnitude of the second virtual impedance reference so as to reduce current in the inverter-based resource. At a certain time period after activating the soft activation module, the method includes transitioning the second virtual reactance and the second virtual resistance to a virtual reactance and a virtual resistance defined by the change.

18 Claims, 12 Drawing Sheets

(56) References Cited

U.S. PATENT DOCUMENTS

| | | | |
|---|---|---|---|
| 7,804,184 | B2 | 9/2010 | Yuan et al. |
| 9,270,194 | B2 | 2/2016 | Brogan et al. |
| 10,756,536 | B2 | 8/2020 | Kral et al. |
| 10,879,785 | B2 | 12/2020 | Shuai et al. |
| 2017/0314534 | A1* | 11/2017 | Gupta ............... H02J 3/381 |
| 2023/0208140 | A1* | 6/2023 | Weiss ............... H02M 7/537 |
| | | | 363/131 |

OTHER PUBLICATIONS

Awal et al., Unified Virtual Oscillator Control for Grid-Forming and Grid-Following Converters, IEEE Journal of Emerging and Selected Topics in Power Electronics, vol. 9, Issue 4, Aug. 2021, pp. 4573-4586. (Abstract Only) https://ieeexplore.ieee.org/abstract/document/9203895.

Bergen et al., A Structure Preserving Model for Power System Stability Analysis, IEEE Transactions on Power Apparatus and Systems, vol. PAS-100, Issue 1, Jan. 1981, pp. 25-35. (Abstract Only) https://ieeexplore.ieee.org/document/4110445.

Brabandere et al., Small-Signal Stability of Grids with Distributed Low-Inertia Generators Taking into Account Line Phasor Dynamics, 18$^{th}$ International Conference and Exhibition on Electricity Distribution, 2005. (Abstract Only) https://ieeexplore.ieee.org/document/5428013.

Cheema et al., Modification in Active Power-Frequency Loop of Virtual Synchronous Generator to Improve the Transient Stability, International Journal of Electrical Power & Energy Systems, 106668, vol. 128, Jun. 2021. (Abstract Only) https://doi.org/10.1016/j.ijepes.2020.106668.

Choi et al., Cascading Collapse of a Large-Scale Mixed Source Microgrid Caused by Fast-Acting Inverter-Based Distributed Energy Resources, IEEE Transaction on Industry Applications, vol. 54, Issue 6, Nov.-Dec. 2018, pp. 5727-5735. (Abstract Only) https://ieeexplore.ieee.org/document/8409294.

D'Arco et al., Virtual Synchronous Machines—Classification of Implementations and Analysis of Equivalence to Droop Controllers for Microgrids, 2013 IEEE Grenoble Conference, 2013, pp. 1-7. (Abstract Only) https://ieeexplore.ieee.org/document/6652456.

Davy et al., Lyapunov Functions for Multimachine Power Systems with Dynamic Loads, IEEE Transactions on Circuits and Systems I: Fundamental Theory and Applications, vol. 44, Issue 9, Sep. 1997, pp. 796-812. (Abstract Only) https://ieeexplore.ieee.org/document/622983.

Dedeoglu et al., Grid-Supporting Three-Phase Inverters with Inherent Root Mean Square Current Limitation Under Balanced Grid Voltage Sags, IEEE Transactions on Industrial Electronics, vol. 68, Issue 11, Nov. 2021, pp. 11379-11389. (Abstract Only) https://ieeexplore.ieee.org/document/9248628.

Demarco et al., A Generalized Eigenvalue Perturbation Approach to Coherency, Proceedings of International Conference Control Applications, 1995, pp. 611-617. (Abstract Only) https://ieeexplore.ieee.org/document/555802.

Du et al., Voltage-Source Control of PV Inverter in a CERTS Microgrid, IEEE Transactions on Power Delivery, vol. 29, No. 4, Feb. 2014, pp. 1726-1734. (Abstract Only) https://ieeexplore.ieee.org/document/6740077.

Erickson et al., Improved Power Control Bandwidth of Grid-Forming Sources in a CERTS Microgrid, IEEE Energy Conversion Congress and Exposition (ECCE), 2012, pp. 2366-2373. (Abstract Only) https://ieeexplore.ieee.org/abstract/document/6342459.

Eskandari et al., On the Impact of Fault Ride-Through on Transient Stability of Autonomous Microgrids: Nonlinear Analysis and Solution, IEEE Transactions on Smart Grid, vol. 12, Issue 2, Mar. 2021, pp. 999-1010. (Abstract Only) https://ieeexplore.ieee.org/document/9220790.

Gkountaras et al., Evaluation of Current Limiting Methods for Grid Forming Inverters in Medium Voltage Microgrids, 2015 IEEE Energy Conversion Congress and Exposition (ECCE), Sep. 2015, pp. 1223-1230. (Abstract Only) https://ieeexplore.ieee.org/abstract/document/7309831.

Groß et al., Projected Grid-Forming Control for Current-Limiting of Power Converters, Annual Allerton Conference on Communication, Control, and Computing, Sep. 2019, pp. 326-333. (Abstract Only) https://ieeexplore.ieee.org/document/8919856.

Hart et al., Coherency Identification and Aggregation in Grid-Forming Droop-Controlled Inverter Networks, IEEE Transactions on Industry Applications, vol. 55, Issue 3, May-Jun. 2019, pp. 2219-2231. (Abstract Only) https://ieeexplore.ieee.org/document/8606184.

Hart et al., Energy Function for a Grid-Tied, Droop-Controlled Inverter, 2014 North American Power Symposium (NAPS), Sep. 2014, pp. 1-6. (Abstract Only) https://ieeexplore.ieee.org/document/6965437.

Hart et al., Enforcing Coherency in Droop-Controlled Inverter Networks Through Use of Advanced Voltage Regulation and Virtual Impedance, IEEE Energy Conversion Congress and Exposition (ECCE), 2017, pp. 3367-3374. (Abstract Only) https://ieeexplore.ieee.org/abstract/document/8096605.

Hart, Reduced-Order Modeling and Analysis of Droop-Controlled, Inverter-Based Distributed Generation Networks, ProQuest Ph.D. Dissertations and Theis, The University of Wisconsin—Madison, vol. 79-04(E), Section B, 2017, 370 Pages. (Abstract Only) https://ui.adsabs.harvard.edu/abs/2017PhDT...176H/abstract.

Kabalan et al., Nonlinear Lyapunov Stability Analysis of Seven Models of a DC/AC Droop Controlled Inverter Connected to an Infinite Bus, IEEE Transactions on Smart Grid, vol. 10, Issue 1, Jan. 2019, pp. 772-781. (Abstract Only) https://ieeexplore.ieee.org/document/8036269.

Klump et al., A New Method for Finding Low-Voltage Power Flow Solutions, 2000 Power Engineering Society Summer Meeting (Cat. No. 00CH37134), vol. 1, 2000, pp. 593-597. (Abstract Only) https://ieeexplore.ieee.org/document/867653.

Kron, Tensor Analysis of Networks, John Wiley & Sons, New York, 1939. (Book).

Li et al., A New Current Limiting and Overload Protection Scheme for Distributed Inverters in Microgrids Under Grid Faults, IEEE Transactions on Industry Applications, vol. 57, Issue 6, Nov-Dec. 2021, pp. 6362-6374. (Abstract Only) https://ieeexplore.ieee.org/document/9511809.

Mathworks, MATLAB (MATrix LABoratory) for Artificial Intelligence, 2021. Accessed Dec. 1, 2021 online from https://www.mathworks.com (Web Link Only).

Mitra et al., A Homotopy-Based Method for Robust Computation of Controlling Unstable Equilibrium Points, IEEE Transactions on Power Systems, vol. 35, Issue 2, Mar. 2020, pp. 1422-1431. (Abstract Only) https://ieeexplore.ieee.org/document/8846055.

Pai, Energy Function Analysis for Power System Stability, Part of the Kluwer International Series in Engineering and Computer Science book series, 1989. (Web Link Only) https://link.springer.com/book/10.1007/978-1-4613-1635-0.

Paquette et al., Virtual Impedance Current Limiting for Inverters in Microgrids with Synchronous Generators, IEEE Transactions on Industry Applications, vol. 51, Issue 2, Mar.-Apr. 2015, pp. 1630-1638. (Abstract Only) https://ieeexplore.ieee.org/abstract/document/6872529 https://www.semanticscholar.org/paper/Virtual-Impedance-Current-Limiting-for-Inverters-in-Paquette-Divan/64a504d3d04a522f9b9b2c5d3938ae165c66bd6d#paper-header.

Pattabiraman et al., Transient Stability Modeling of Droop-Controlled Grid-Forming Inverters with Fault Current Limiting, 2020 IEEE Power & Energy Society General Meeting (PEGSM), Aug. 2020, pp. 1-5. (Abstract Only) https://ieeexplore.ieee.org/document/9281712.

Piagi, Microgrid Control, Dissertation or Thesis, University of Wisconsin-Madison, 2005. (Abstract Only).

Plexim, Plexim Electrical Engineering Software. Available online at https://www.plexim.com/ (Weblink Only).

Qoria et al., Critical Clearing Time Determination and Enhancement of Grid-Forming Converters Embedding Virtual Impedance as Current Limitation Algorithm, IEEE Journal of Emerging and

(56) References Cited

OTHER PUBLICATIONS

Selected Topics in Power Electronics, vol. 8, Issue 2, Jun. 2020, pp. 1050-1061. (Abstract Only) https://ieeexplore.ieee.org/document/8931732.

Qoria et al., Current Limiting Algorithms and Transient Stability Analysis of Grid-Forming VSCs, Electric Power Systems Research, vol. 189, Dec. 2020. (Abstract Only) https://www.sciencedirect.com/science/article/abs/pii/S0378779620305290.

Rosso et al., On the Implementation of an FRT Strategy for Grid-Forming Converters Under Symmetrical and Asymmetrical Grid Faults, IEEE Transactions on Industry Applications, vol. 57, Issue 5, 2021, pp. 4385-4397. (Abstract Only) https://ieeexplore.ieee.org/document/9477148.

Schiffer et al., Conditions for Stability of Droop-Controlled Inverter-Based Microgrids, Automatica, vol. 50, Issue 10, Oct. 2014, pp. 2457-2469. (Abstract Only) https://www.sciencedirect.com/science/article/abs/pii/S0005109814003100.

Shi et al., Low-Voltage Ride-Through Control Strategy for a Virtual Synchronous Generator Based on Smooth Switching, IEEE Access, vol. 6, 2018, pp. 2703-2711. (Abstract Only) https://ieeexplore.ieee.org/document/8225632.

Shuai et al., Transient Angle Stability of Virtual Synchronous Generators Using Lyapunov's Direct Method, IEEE Transactions on Smart Grid, vol. 10, Issue 4, Jul. 2019, pp. 4648-4661. (Abstract Only) https://ieeexplore.ieee.org/document/8444083.

Simpson-Porco et al., Synchronization and Power Sharing for Droop-Controlled Inverters in Islanded Microgrids, Automatica, vol. 49, Issue 9, Sep. 2013, pp. 2603-2611. (Abstract Only) https://www.sciencedirect.com/science/article/abs/pii/S0005109813002884.

Tang et al., Coordinated Control of Adaptive Damping and Additional Torque for Transient Stability Improvement of Virtual Synchronous Generator, 2021 IEEE 4th International Conference on Computing, Power and Communication Technologies (GUCON), 2021, pp. 1-5. (Abstract Only) https://ieeexplore.ieee.org/abstract/document/9573550.

Taul et al., Current Limiting Control with Enhanced Dynamics of Grid-Forming Converters During Fault Conditions, IEEE Journal of Emerging and Selected Topics in Power Electronics, vol. 8, No. 2, Jun. 2020, pp. 1062-1073. https://ieeexplore.ieee.org/stamp/stamp.jsp?tp=&arnumber=8779657.

Varaiya et al., Direct Methods for Transient Stability Analysis of Power Systems: Recent Results, Proceedings of the IEEE, vol. 73, Issue 12, Dec. 1985, pp. 1703-1985. (Abstract Only) https://ieeexplore.ieee.org/abstract/document/1457634.

Vilathgamuwa et al., Protection of Microgrids During Utility Voltage Sags, IEEE Transactions on Industrial Electronics, vol. 53, Issue 5, Oct. 2006, pp. 1427-1436. (Abstract Only) https://ieeexplore.ieee.org/document/1705634.

Wu et al., A Mode-Adaptive Power-Angle Control Method for Transient Stability Enhancement of Virtual Synchronous Generators, IEEE Journal of Emerging and Selected Topics in Power Electronics, vol. 8, Issue 2, Jun. 2020, pp. 1034-1049. (Abstract Only) https://ieeexplore.ieee.org/document/9016216.

Xin et al., Synchronous Instability Mechanism of P-f Droop-Controlled Voltage Source Converter Caused by Current Saturation, IEEE Transactions on Power Systems, vol. 31, Issue 6, Nov. 2016, pp. 5206-5207. (Abstract Only) https://ieeexplore.ieee.org/document/7406768.

Xiong et al., Transient Damping Method for Improving the Synchronization Stability of Virtual Synchronous Generators, IEEE Transactions on Power Electronics, vol. 36, Issue 7, Jul. 2021, pp. 7820-7831. (Abstract Only) https://ieeexplore.ieee.org/document/9303430.

Zhang et al., Coordinated Utilization of Adaptive Inertia Control and Virtual Impedance Regulation for Transient Performance Increase of VSG Under Different Faults, 2021 6th Asia Conference on Power and Electrical Engineering (ACPEE), Apr. 2021, pp. 838-843. (Abstract Only) https://ieeexplore.ieee.org/document/9437123.

Zheng et al., Model Predictive Control-Based Virtual Inertia Emulator for an Islanded Alternating Current Microgrid, IEEE Transactions on Industrial Electronics, vol. 68, Issue 8, Aug. 2021, pp. 7167-7177. (Abstract Only) https://ieeexplore.ieee.org/document/9138790.

Zhong et al., Transient Stability Enhancement for Virtual Synchronous Generator by Combining Direct Power Control, IEEE Energy Conversion Congress and Exposition (ECCE), 2021, pp. 323-328. (Abstract Only) https://ieeexplore.ieee.org/document/9595568.

European Search Report Corresponding to EP23171392 on Oct. 20, 2023.

Buraimoh et al., Fault Ride-Through Analysis of Current- and Voltage-Source Models of Grid Supporting Inverter-Based Microgrid, XP011860883, IEEE Canadian Journal of Electrical and Computer Engineering, vol. 44, No. 2, 2021, 189-198.

Jin et al., A DQ-Frame Asymmetrical Virtual Impedance Control for Enhancing Transient Stability of Grid-Forming Inverters, IEEE Transactions on Power Electronics, vol. 37, No. 4, 2022, 10 Pages.

* cited by examiner

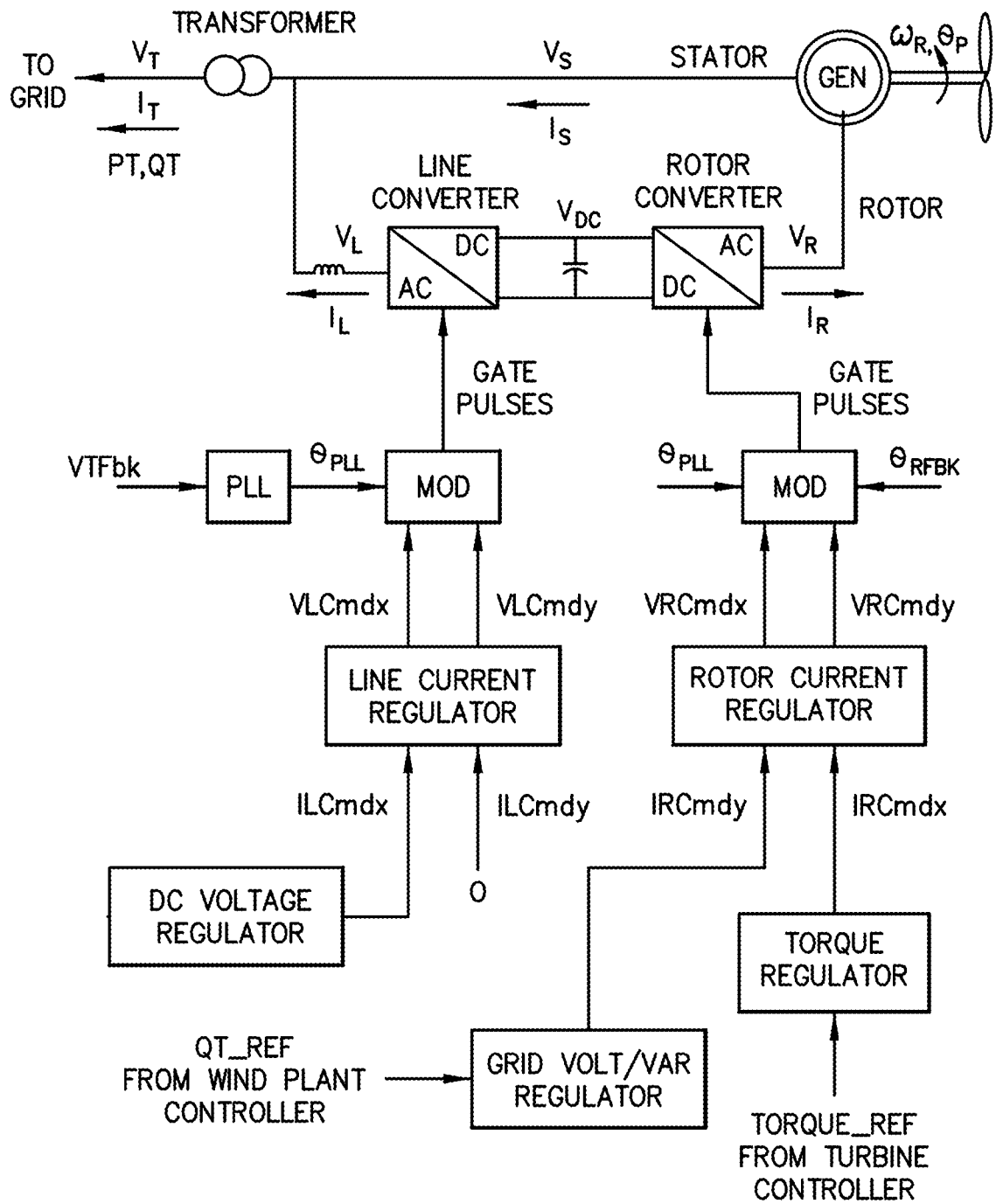
FIG. -1-
PRIOR ART

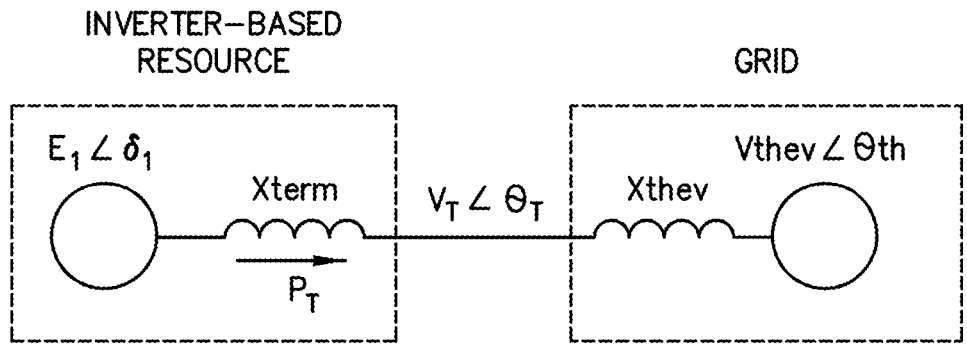
FIG. -2-
PRIOR ART
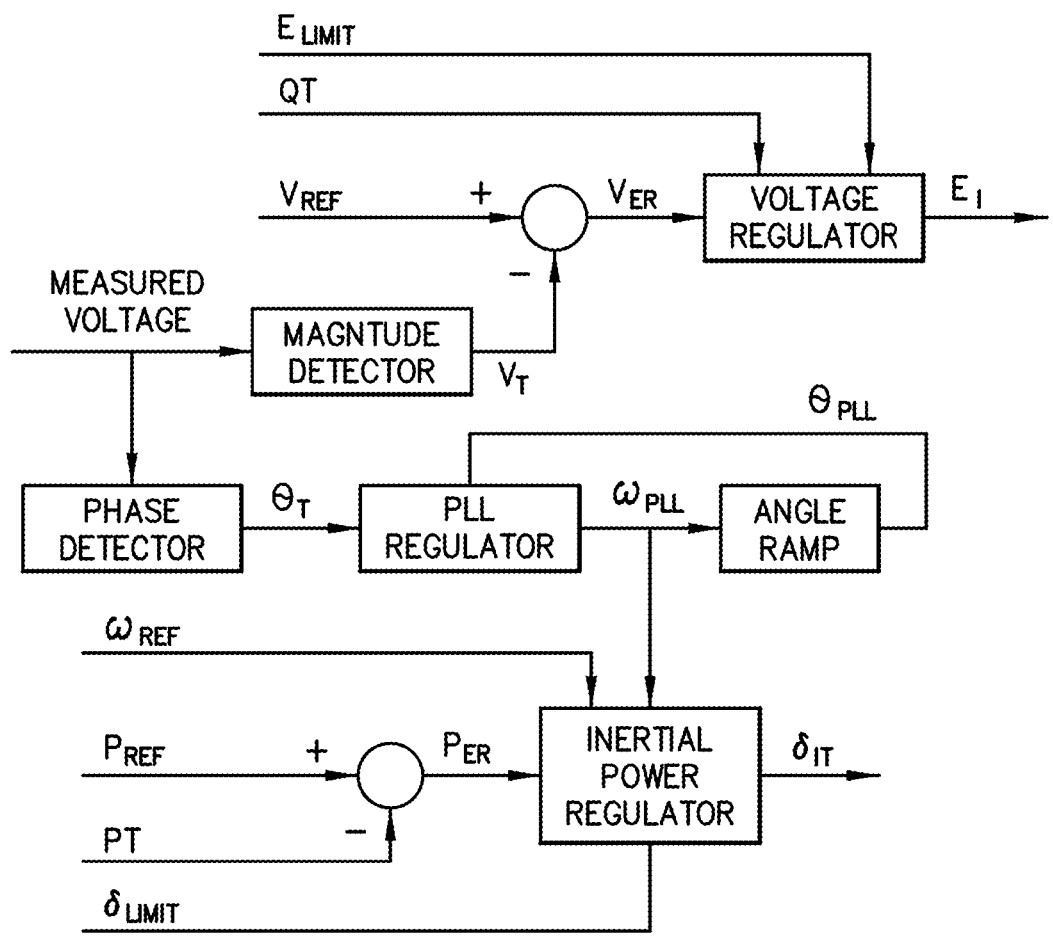
FIG. -3-

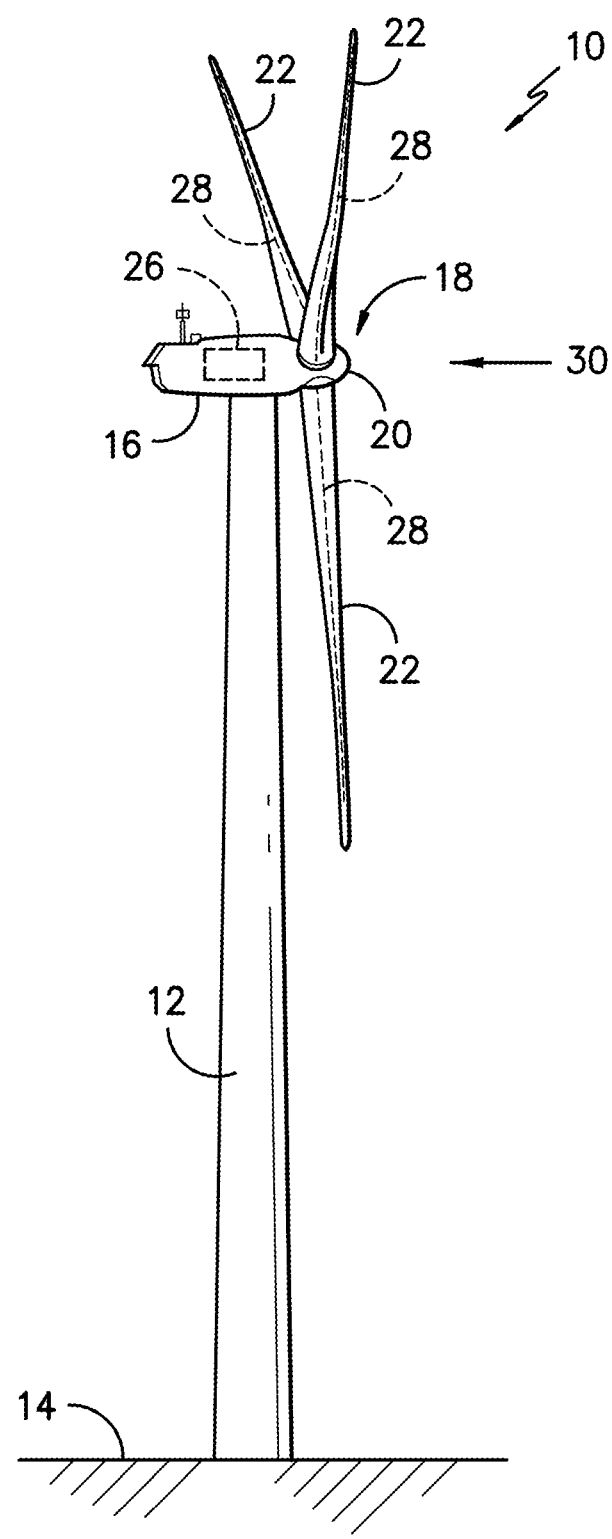
FIG. -4-

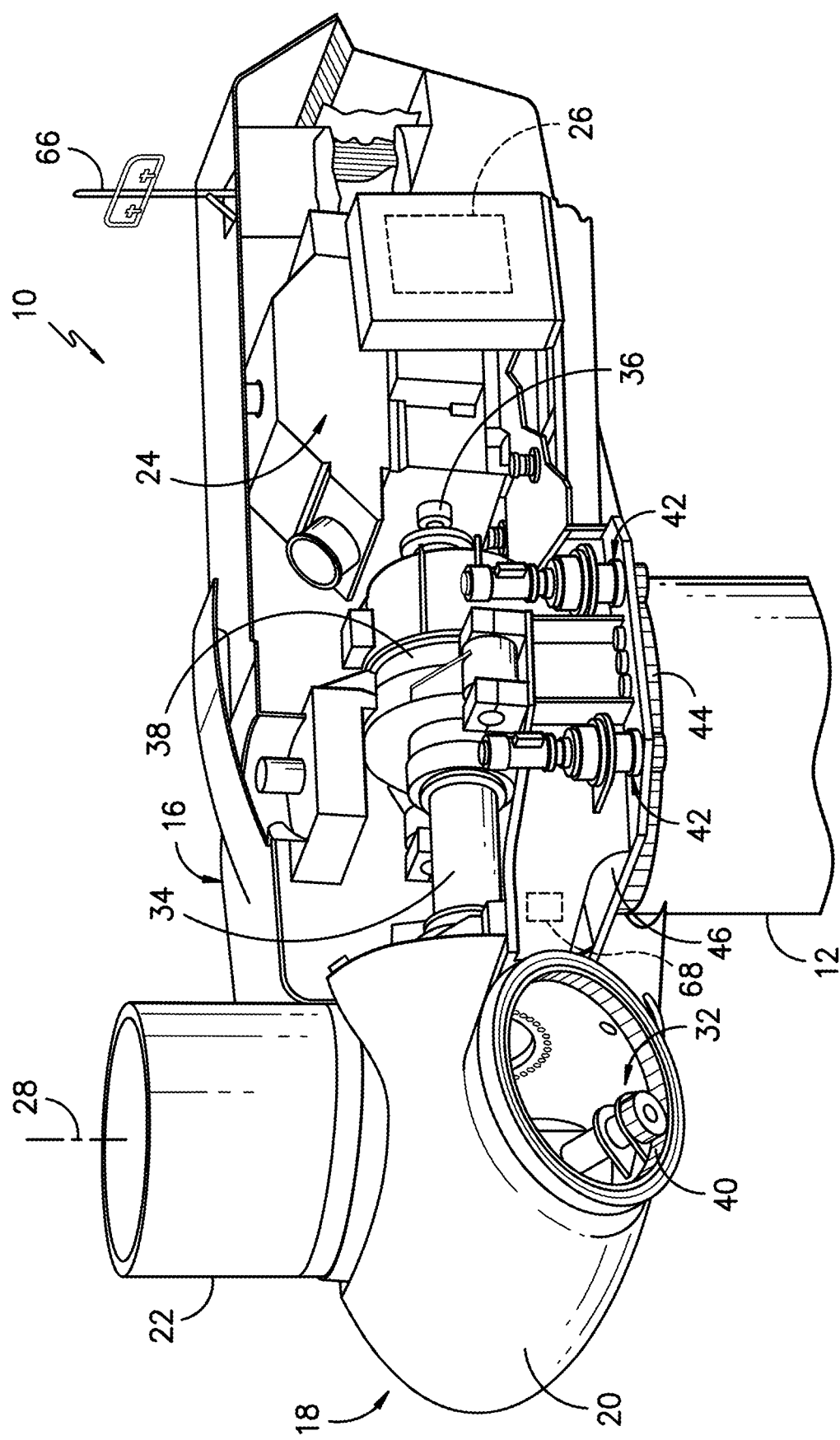
FIG. -5-

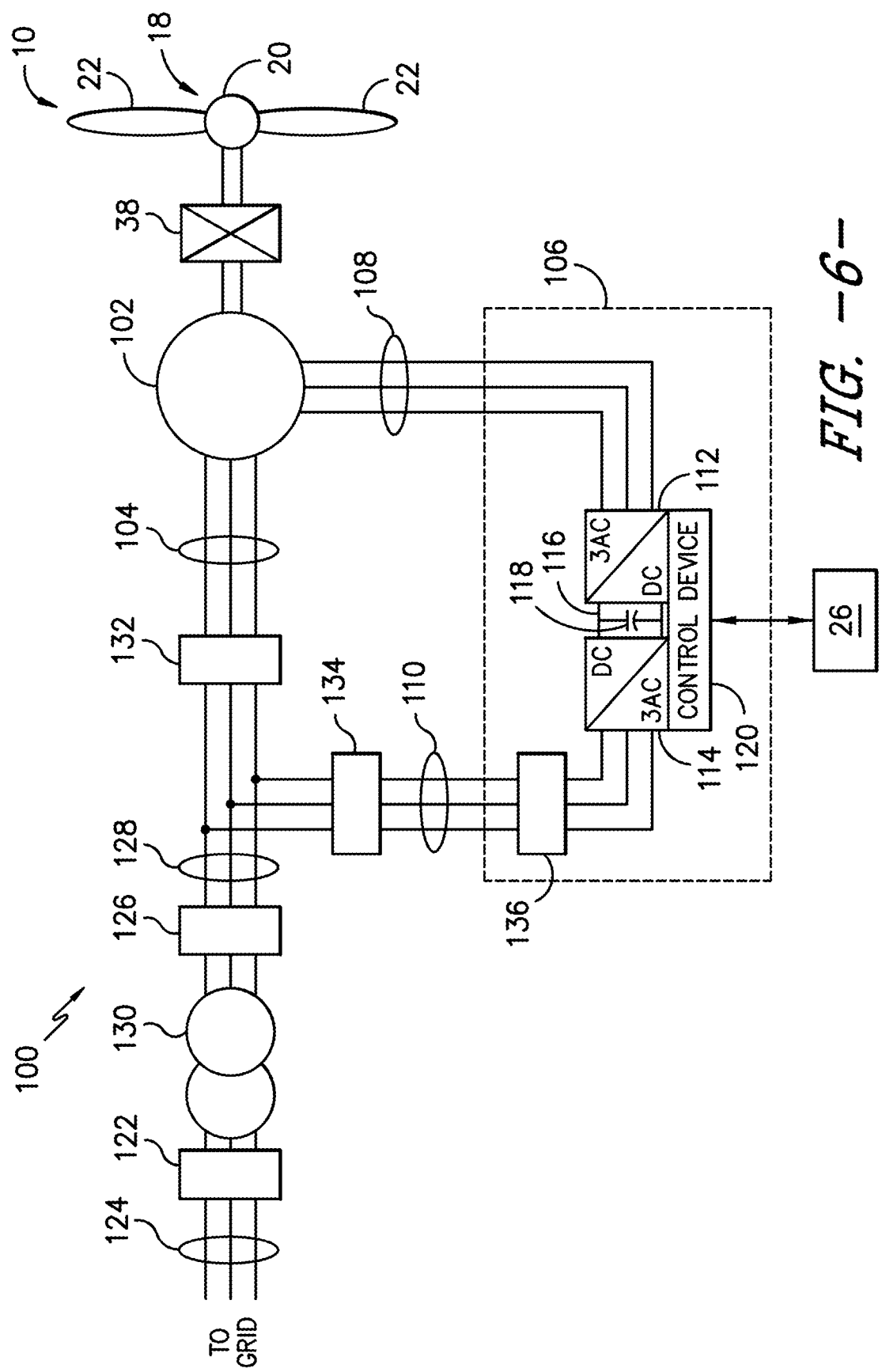
FIG. -6-

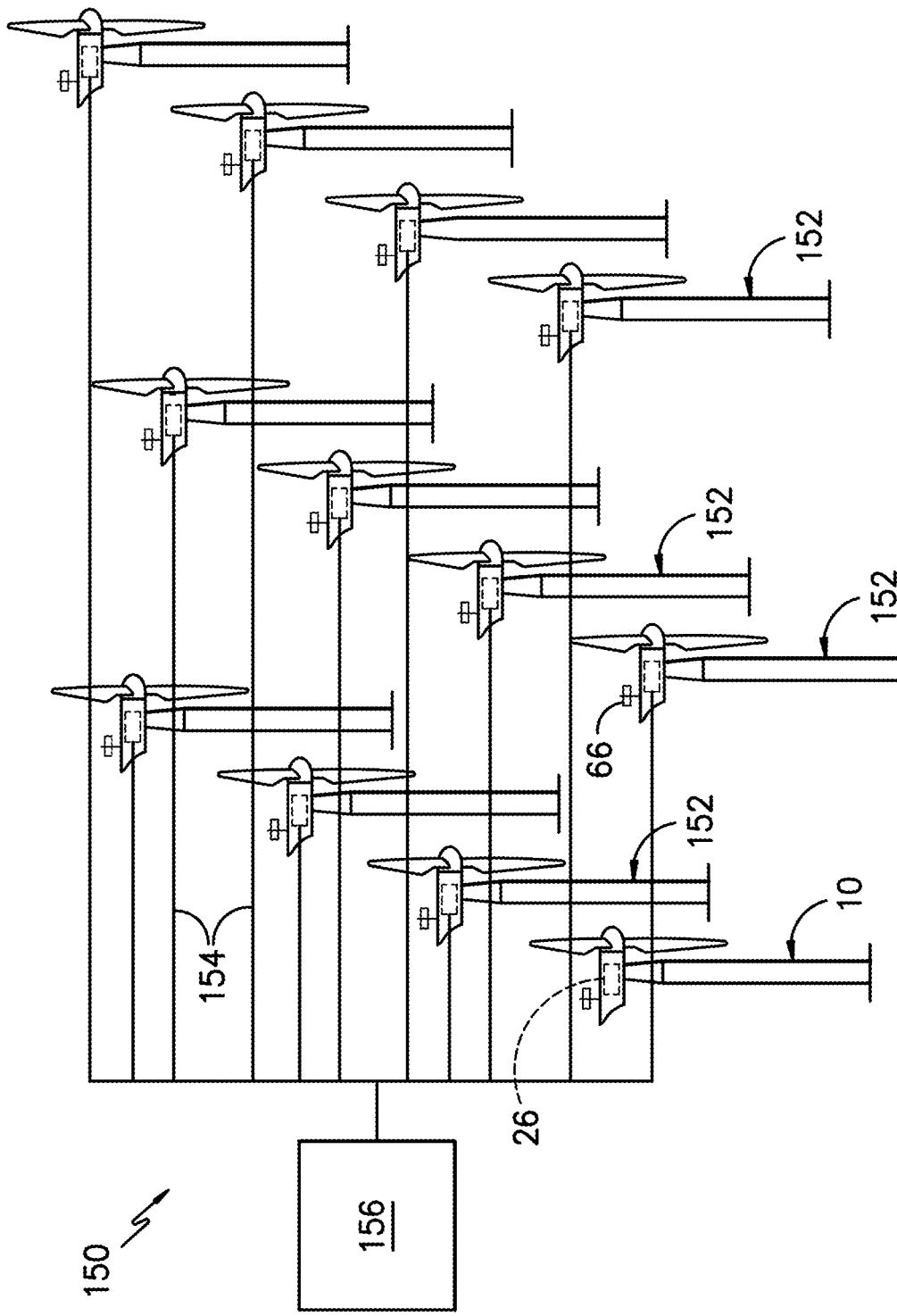

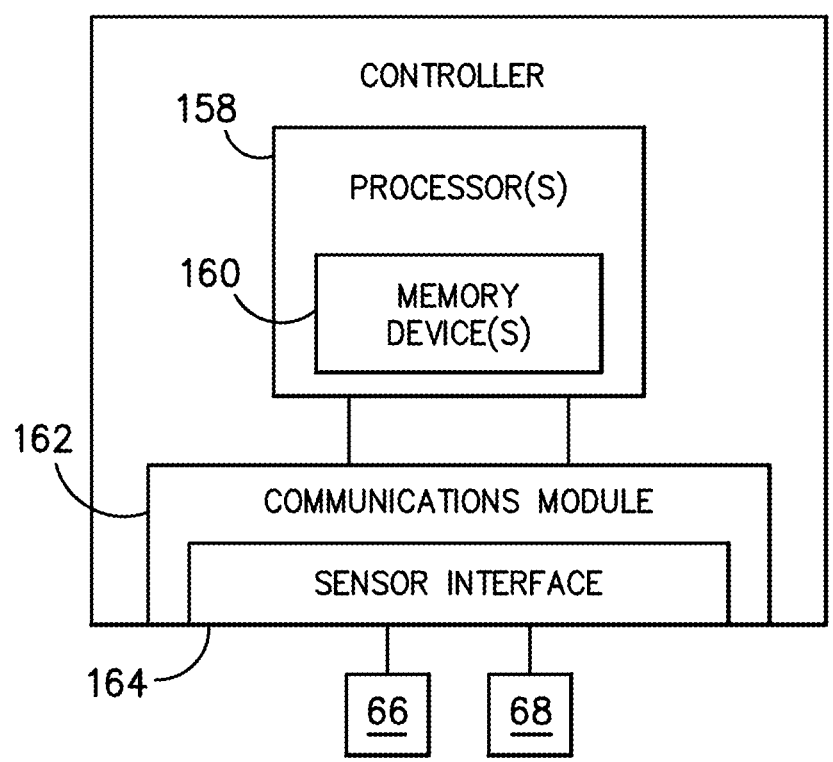
FIG. -8-

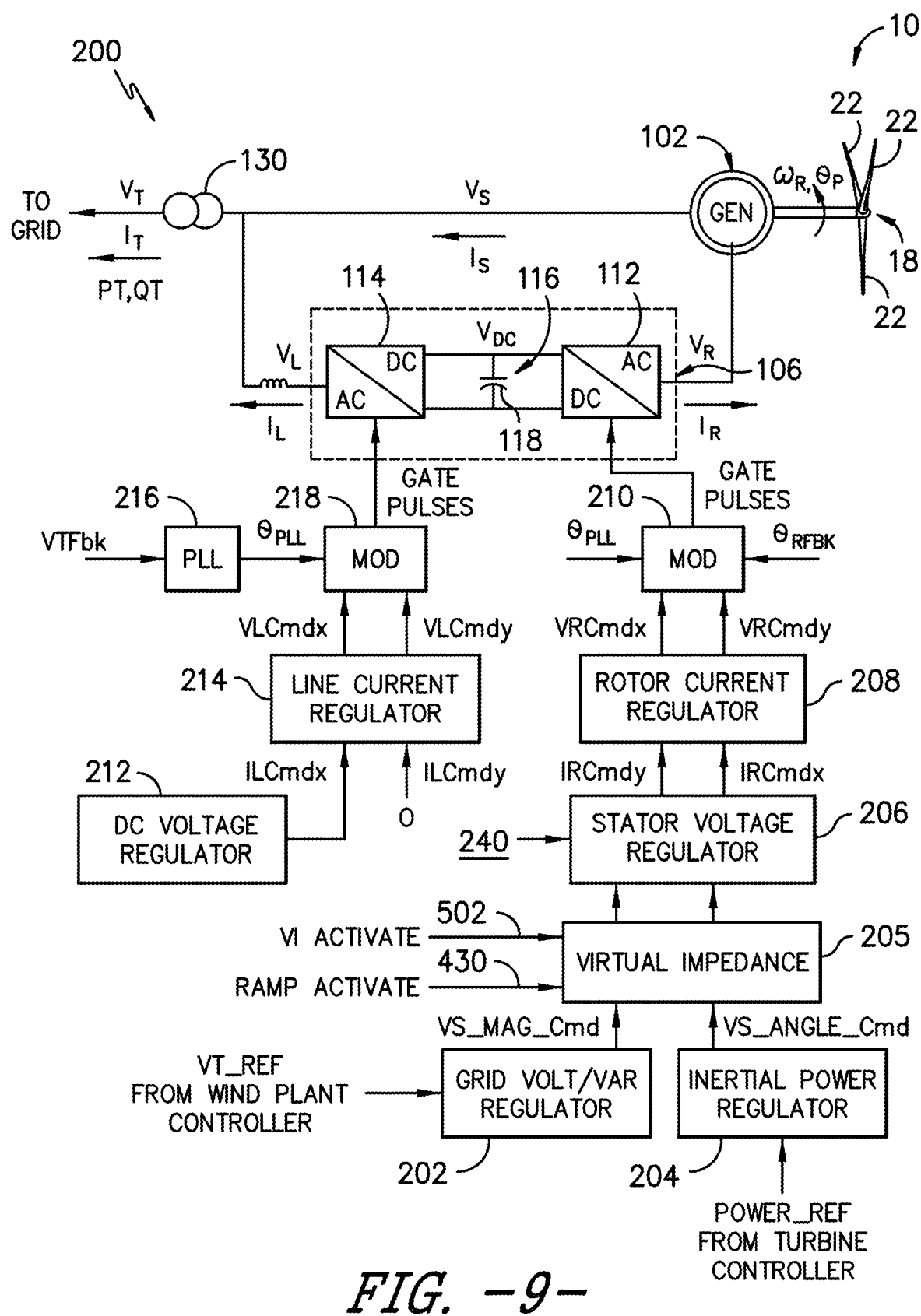
FIG. -9-

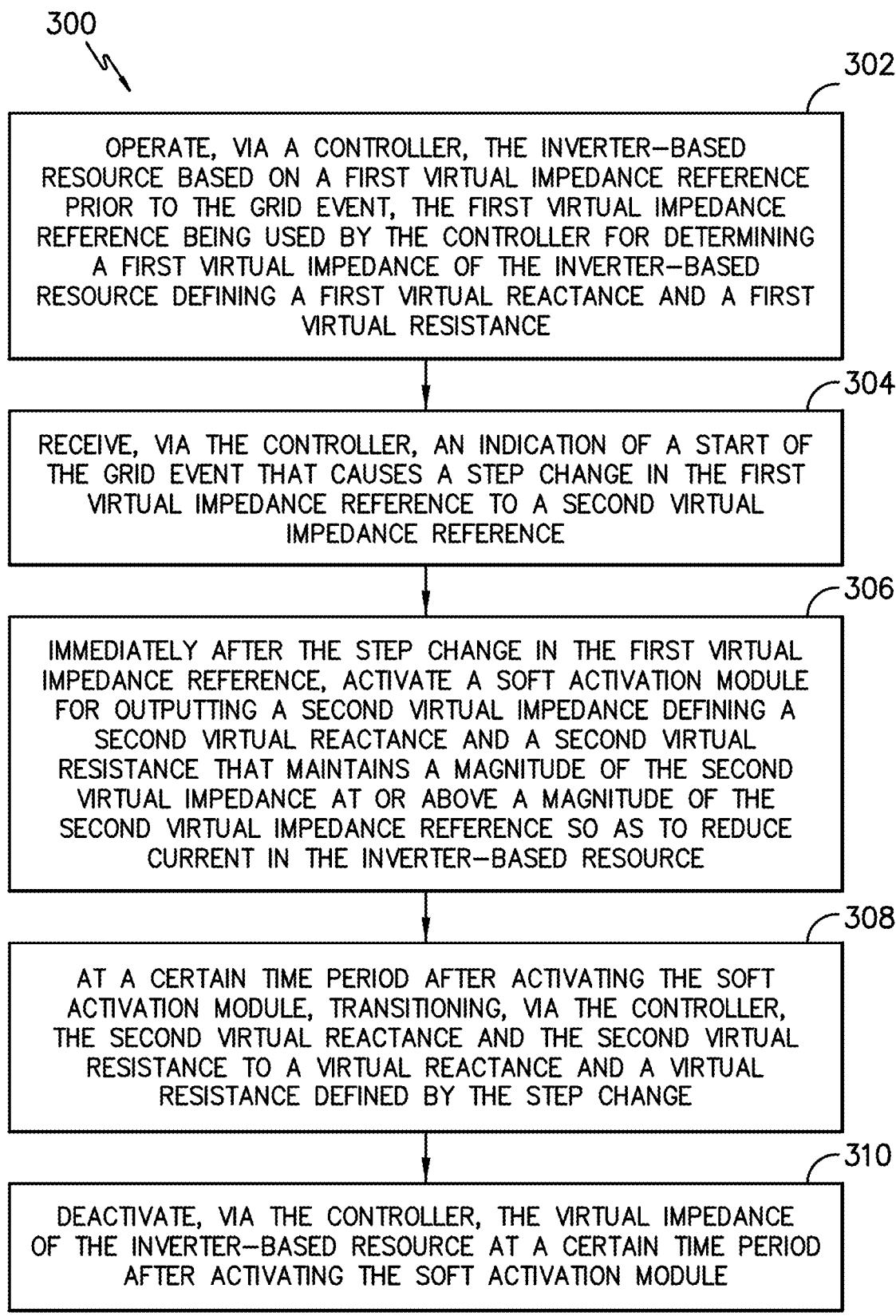
FIG. -10-

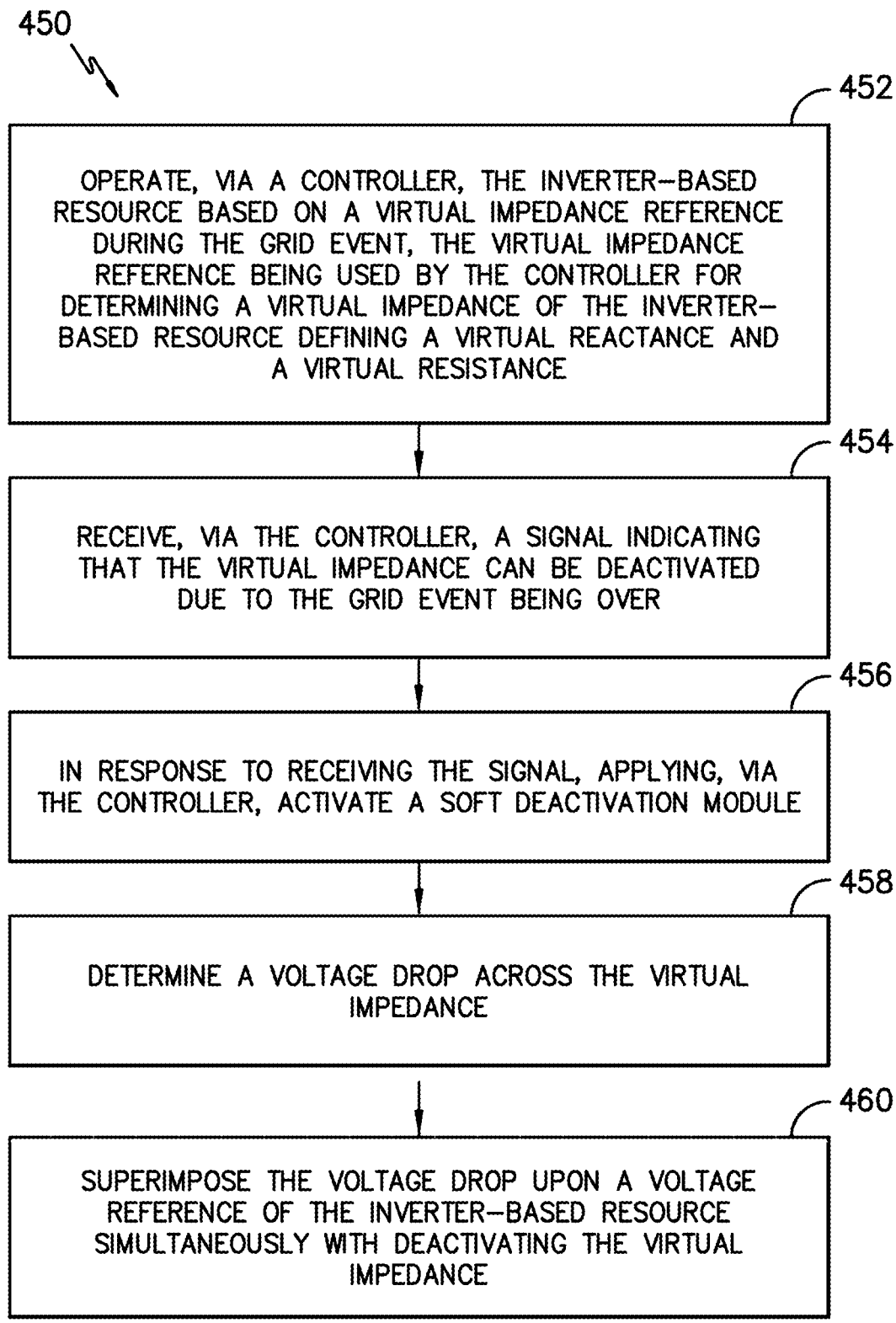
FIG. -11-

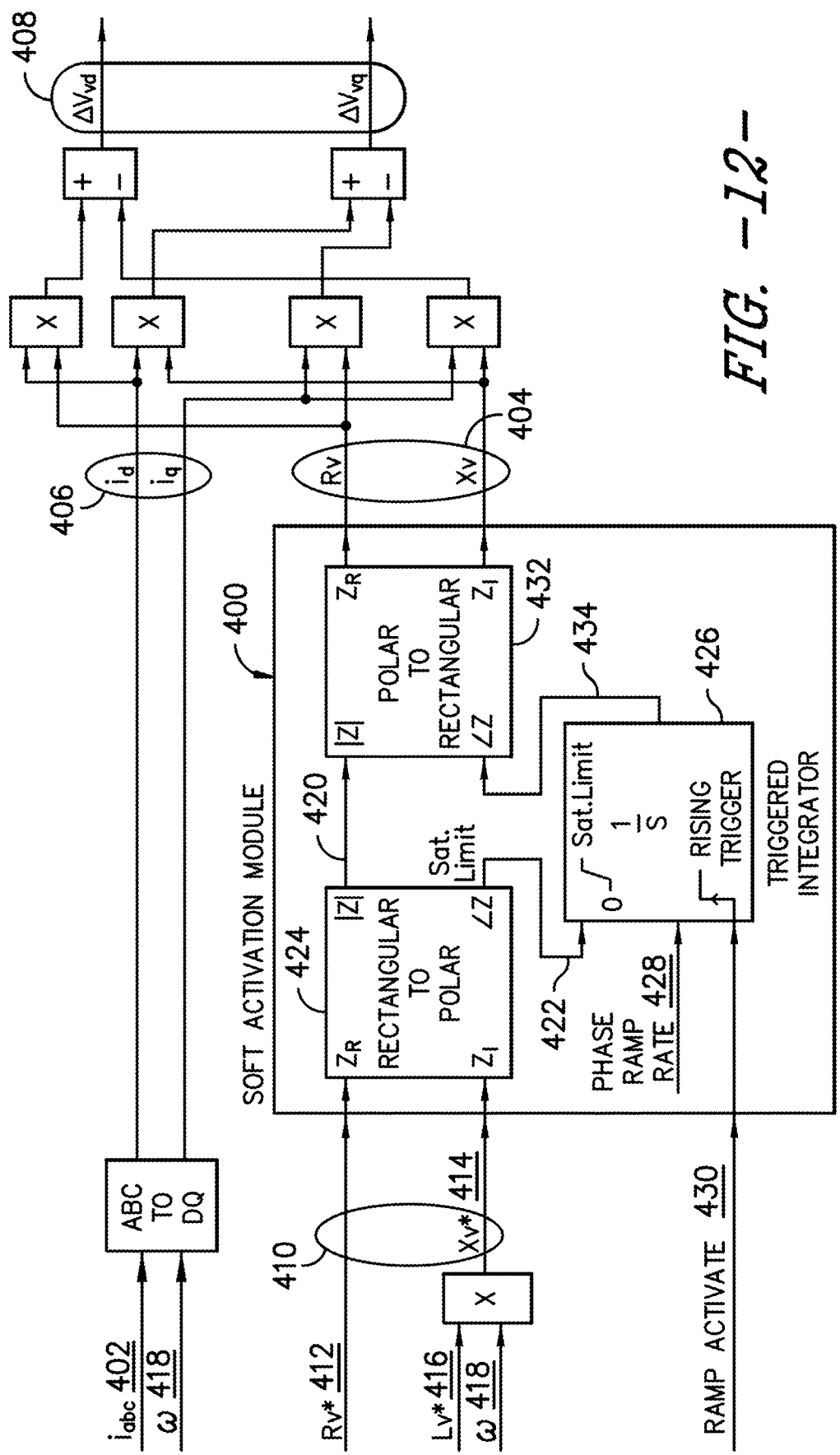
FIG. -12-

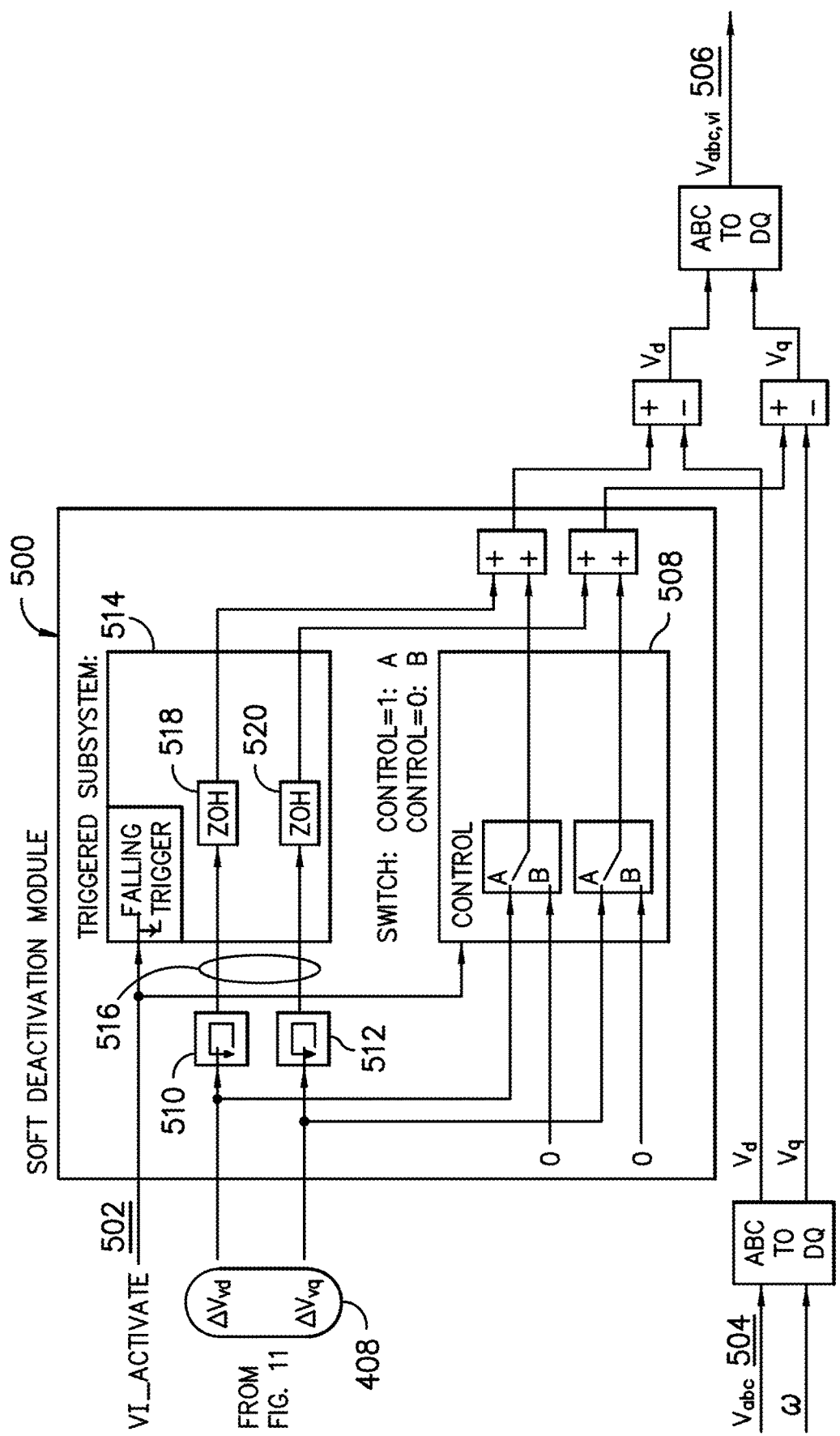
FIG. -13-

VIRTUAL IMPEDANCE CURRENT LIMITING CONTROL FOR GRID FORMING INVERTER-BASED RESOURCES

STATEMENT REGARDING FEDERALLY SPONSORED RESEARCH OR DEVELOPMENT

This invention was made with Government support under Contract No. DE-EE0009024 awarded by the U.S. Department of Energy (DOE). The Government has certain rights in the invention.

FIELD

The present disclosure relates generally to inverter-based resources, such as wind turbine generators and, more particularly, to systems and methods for controlling an inverter-based resource connected to a power grid during a grid event using a virtual impedance.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is typically geared to a generator for producing electricity.

Wind turbines can be distinguished in two types: fixed speed and variable speed turbines. Conventionally, variable speed wind turbines are controlled as current sources connected to a power grid. In other words, the variable speed wind turbines rely on a grid frequency detected by a phase locked loop (PLL) as a reference and inject a specified amount of current into the grid. The conventional current source control of the wind turbines is based on the assumptions that the grid voltage waveforms are fundamental voltage waveforms with fixed frequency and magnitude and that the penetration of wind power into the grid is low enough so as to not cause disturbances to the grid voltage magnitude and frequency. Thus, the wind turbines simply inject the specified current into the grid based on the fundamental voltage waveforms. However, with the rapid growth of the wind power, wind power penetration into some grids has increased to the point where wind turbine generators have a significant impact on the grid voltage and frequency. When wind turbines are located in a weak grid, wind turbine power fluctuations may lead to an increase in magnitude and frequency variations in the grid voltage. These fluctuations may adversely affect the performance and stability of the PLL and wind turbine current control.

Furthermore, many existing renewable generation converters, such as double-fed wind turbine generators, operate in a "grid-following" mode. Grid-following type devices utilize fast current-regulation loops to control active and reactive power exchanged with the grid. More specifically, FIG. 1 illustrates the basic elements of the main circuit and converter control structure for a grid-following double-fed wind turbine generator. As shown, the active power reference to the converter is developed by the energy source regulator, e.g., the turbine control portion of a wind turbine. This is conveyed as a torque reference, which represents the lesser of the maximum attainable power from the energy source at that instant, or a curtailment command from a higher-level grid controller. The converter control then determines a current reference for the active component of current to achieve the desired torque. Accordingly, the double-fed wind turbine generator includes functions that manage the voltage and reactive power in a manner that results in a command for the reactive component of current. Wide-bandwidth current regulators then develop commands for voltage to be applied by the converters to the system, such that the actual currents closely track the commands.

Alternatively, grid-forming (GFM) inverter-based resources (IBR) act as a voltage source behind an impedance and provide a voltage-source characteristic, where the angle and magnitude of the voltage are controlled to achieve the regulation functions needed by the grid. The term IBR connotes an inverter that converts direct current (dc) to alternating current (ac) and which may be used to interface any energy source to an ac power system. Energy sources can possibly include, but are not limited to, a renewable source such as solar photovoltaic array, wind turbine, battery energy storage system (BESS), ultracapacitor or fossil-fuel based source such as a diesel or natural gas genset, STATCOM, HVDC VSC, or any combination of these energy sources tied to a dc network. Moreover, the term "grid-forming IBR" is generally defined as an IBR that employs a local controller to "stiffly" regulate both (1) the local ac voltage magnitude and (2) local ac frequency (or phase angle) in the fast time-scale. In other words, the response time of the local controller voltage regulation and frequency (or phase) regulation loop is assumed to be well below 100 milliseconds (ms). The disturbance rejection and/or feedback control performance of the voltage and frequency (or phase) regulation loops are sufficiently high-bandwidth (or "stiff") that the voltage and frequency changes only moderately in the face of unexpected grid events throughout a sliding time window of approximately 100 ms.

In addition, the impedance of the GFM IBR is normally dictated by the hardware of the system, such as reactors, transformers, or rotating machine impedances. With this structure, current will flow according to the demands of the grid, while the converter contributes to establishing a voltage and frequency for the grid. This characteristic is comparable to conventional generators based on a turbine driving a synchronous machine. Thus, a grid-forming source must include the following basic functions: (1) support grid voltage and frequency for any current flow within the rating of the equipment, both real and reactive; (2) prevent operation beyond equipment voltage or current capability by allowing grid voltage or frequency to change rather than disconnecting equipment (disconnection is allowed only when voltage or frequency are outside of bounds established by the grid entity); (3) remain stable for any grid configuration or load characteristic, including serving an isolated load or connected with other grid-forming sources, and switching between such configurations; (4) share total load of the grid among other grid-forming sources connected to the grid; (5) ride through grid disturbances, both major and minor, and (6) meet requirements (1)-(5) without requiring fast communication with other control systems existing in the grid, or externally-created logic signals related to grid configuration changes.

The basic control structure to achieve the above grid-forming objectives was developed and field-proven for battery systems in the early 1990's (see e.g., U.S. Pat. No. 5,798,633 entitled "Battery Energy Storage Power Conditioning System"). Applications to full-converter wind generators and solar generators are disclosed in U.S. Pat. No. 7,804,184 entitled "System and Method for Control of a Grid Connected Power Generating System," and U.S. Pat. No. 9,270,194 entitled "Controller for controlling a power converter." Applications to grid-forming control for a doubly-fed wind turbine generator are disclosed in PCT/US2020/013787 entitled "System and Method for Providing Grid-Forming Control for a Doubly-Feb Wind Turbine Generator."

In particular, a simple circuit of a full-conversion grid-forming inverter-based resource connected to a grid is shown in FIG. 2, where the voltage $E_1$ and angle $\delta_1$ reflect quantities synthesized by the grid-forming resource and $X_{term}$ is the reactance of the grid-forming resource. The steady-state power flow in the system is characterized by the following relationship:

$$P_T = (E_1 V_{thev}/(X_{term}+X_{thev}))*\sin(\delta_1-\theta th) \cong (E_1 V_{thev}/(X_{term}+X_{thev}))*(\delta_1-\theta th) \quad \text{Equation (1)}$$

The power generated by the grid-forming resource depends on the external grid voltage ($V_{thev}$) and grid impedance ($X_{thev}$), which are generally unknown and changing. Therefore, for conventional systems, control of the grid-forming resource is practically realized by controlling the voltage source with respect to a locally measured voltage and angle ($V_T$ and $\theta_T$). The active power equation can therefore be written as follows:

$$P_T = (E_1 V_T/X_{term})*\sin(\delta_{1T}) \cong (E_1 V_T/X_{term})*\delta_{1T} \quad \text{Equation (2)}$$

where $\delta_{1T}$ reflects the difference between the grid-forming resource physical voltage angle and the locally measured angle. As such, the active power dynamics of the system are related to the impedance of the system as follows:

$$dP_T/d\delta_{1T} \alpha 1/X_{term} \quad \text{Equation (3)}$$

Referring now to FIG. 3, a schematic diagram for controlling active power and voltage for an inverter-based resource is illustrated. As shown, output $E_1$ reflects the desired converter voltage magnitude and output $\delta_{1T}$ reflects the desired converter voltage angle with respect to a locally measured angle ($\theta_T$). Accordingly, the active power output and voltage are controlled through manipulation of the converter voltage so that the resulting voltage drop across the internal reactance ($X_{term}$) achieves the desired control objectives. This voltage drop is given by the following equation:

$$V_T = E_1 - j*X_{term}*I_T \quad \text{Equation (4)}$$

The $X_{term}$, however, is dictated by the hardware of the power circuit and may include reactors and/or transformer impedance. Furthermore, with grid-forming control, current changes rapidly when there are grid disturbances. Therefore, for conventional systems, the control action is typically gradual to restore the steady-state operating conditions commanded by higher-level controls. The amount of current change is inversely related to the total impedance of the circuit. As such, if the current exceeds limits, the control responds rapidly to force the current to be within limits. However, this drastic nonlinearity can cause chaotic behavior when applied to a grid consisting of many other similar systems. Alternatively, if the current change is too small, then the grid-forming system will not contribute as much as it could to support the grid.

Accordingly, rapid application of a transient virtual impedance is a promising approach by which to provide critical current-limiting capability for grid-forming inverter-based resources during severe grid events. In comparison with other current-limiting methods (such as mode-switching to a grid-following control mode), virtual-impedance-based approaches can provide more reliable and predictable performance for a wide range of possible grid events.

However, the rapid activation of the virtual impedance can result in undesirable current oscillation that can include significant current overshoot past a specified current threshold, defeating the purpose of its activation. Also, this undesirable current oscillation and overshoot can reoccur if there are sudden changes in the grid condition after the initial grid event. Furthermore, once the grid event is over, the deactivation of purely resistive, purely reactive, or complex virtual impedances may result in highly-undesirable levels of forward or reverse power transfer to or from the asset, due to wind-up of the outer power regulation control loop. This phenomenon can necessitate a limit-cycle-like repetitive re-application of the current limiting control, with no guarantee that stable synchronism can be achieved.

Thus, the present disclosure is directed to a system and method that addresses the aforementioned issues. In particular, the present disclosure is directed to systems and methods for controlling an inverter-based resource connected to a power grid during a grid event using a soft activation and a soft deactivation of a virtual impedance.

BRIEF DESCRIPTION

Aspects and advantages of the invention will be set forth in part in the following description, or may be obvious from the description, or may be learned through practice of the invention.

In one aspect, the present disclosure is directed to a method for controlling an inverter-based resource connected to a power grid during a grid event. The method includes operating the IBR based on a first virtual impedance reference prior to the grid event, the first virtual impedance reference being used for determining a first virtual impedance of the IBR defining a first virtual reactance and a first virtual resistance. The method also includes receiving an indication of a start of the grid event that causes a change in the first virtual impedance reference to a second virtual impedance reference. Immediately after the change in the first virtual impedance reference, the method includes activating a soft activation module for outputting a second virtual impedance defining a second virtual reactance and a second virtual resistance that maintains a magnitude of the second virtual impedance at or above a magnitude of the second virtual impedance reference so as to reduce current in the inverter-based resource. At a certain time period after activating the soft activation module, the method includes transitioning the second virtual reactance and the second virtual resistance to a virtual reactance and a virtual resistance defined by the change.

In another aspect, the present disclosure is directed to a method for controlling an inverter-based resource connected to a power grid during a grid event. The method includes operating, via a controller, the inverter-based resource based on a virtual impedance reference during the grid event, the virtual impedance reference being used by the controller for determining a virtual impedance of the inverter-based resource defining a virtual reactance and a virtual resistance. The method also includes receiving, via the controller, a signal indicating that the virtual impedance can be deactivated due to the grid event being over. In response to receiving the signal, the method includes applying, via the controller, activating a soft deactivation module. Activating the soft deactivation module includes, for example, determining a voltage drop across the virtual impedance; and superimposing the voltage drop upon a voltage reference of the inverter-based resource simultaneously with deactivating the virtual impedance.

In yet another aspect, the present disclosure is directed to a system for controlling an inverter-based resource connected to a power grid during a grid event. The system includes a controller having at least one processor. The processor(s) is configured to perform a plurality of operations, including but not limited to operating the IBR based on a first virtual impedance reference prior to the grid event, the first virtual impedance reference being used for determining a first virtual impedance of the IBR defining a first virtual reactance and a first virtual resistance, receiving an indication of a start of the grid event that causes a change in the first virtual impedance reference to a second virtual impedance reference, immediately after the change in the first virtual impedance reference, the method includes activating a soft activation module for outputting a second virtual impedance defining a second virtual reactance and a second virtual resistance that maintains a magnitude of the second virtual impedance at or above a magnitude of the second virtual impedance reference so as to reduce current in the inverter-based resource, and at a certain time period after activating the soft activation module, the method includes transitioning the second virtual reactance and the second virtual resistance to a virtual reactance and a virtual resistance defined by the change. It should be understood that the system may further include any of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a one-line diagram of a double-fed wind turbine generator with structure of converter controls for grid-following application according to conventional construction;

FIG. 2 illustrates a circuit diagram of one embodiment of a grid-connected grid-forming inverter-based resource according to conventional construction;

FIG. 3 illustrates a schematic diagram of one embodiment of power and voltage control of a grid-connected grid-forming inverter-based resource according to conventional construction;

FIG. 4 illustrates a perspective view of one embodiment of a wind turbine according to the present disclosure;

FIG. 5 illustrates a simplified, internal view of one embodiment of a nacelle according to the present disclosure;

FIG. 6 illustrates a schematic view of one embodiment of a wind turbine electrical power system suitable for use with the wind turbine shown in FIG. 4;

FIG. 7 illustrates a schematic view of one embodiment of a wind farm having a plurality of wind turbines according to the present disclosure;

FIG. 8 illustrates a block diagram of one embodiment of a controller according to the present disclosure;

FIG. 9 illustrates a one-line diagram of a double-fed wind turbine generator with converter controls for grid-forming application according to the present disclosure;

FIG. 10 illustrates a flow diagram of one embodiment of method for controlling an inverter-based resource connected to a power grid during a grid event according to the present disclosure;

FIG. 11 illustrates a flow diagram of another embodiment of method for controlling an inverter-based resource connected to a power grid during a grid event according to the present disclosure;

FIG. 12 illustrates a schematic diagram of one embodiment of a soft activation module of a control scheme for an inverter-based resource according to the present disclosure; and FIG. 13 illustrates a schematic diagram of one embodiment of a soft deactivation module of a control scheme for an inverter-based resource according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to systems and method for controlling an inverter-based resource connected to a power grid during a grid event. In one embodiment, for example, a novel synchronous-reference-frame virtual-impedance-based current limiting control is introduced that provides a soft activation and soft deactivation of virtual impedance to address the aforementioned challenges described herein. More specifically, the proposed control scheme can achieve instantaneous current limiting with no overshoot past a specified current threshold for any severe grid event. At the instant the overload threshold is met, the proposed soft activation control feature instantly activates a pre-specified virtual impedance (defined by a pre-specified magnitude and phase angle) and momentarily adjusts the phase angle of this virtual impedance (away from its pre-specified value) to eliminate the potential for over currents, while the magnitude of the virtual impedance is maintained at its pre-specified value. Shortly after the initial activation of the virtual impedance, the phase angle of the virtual impedance is returned to its pre-specified value and held at that value for the duration of the event in order to achieve the desired power regulation dynamics.

To smoothly deactivate the virtual impedance once the event is over, (e.g., after it has been determined that a fault has cleared), a soft deactivation feature is proposed. Using this soft deactivation feature, the latest phase angle and voltage magnitude drop across the virtual impedance are superimposed upon the inverter voltage reference at the same instant that the virtual impedance is removed. As a result, after the grid event is over, the inverter-based resource can smoothly ramp its active power to any desired value at a rate determined by the power regulation control bandwidth. An outer voltage regulation loop can then be employed to smoothly restore the terminal voltage magnitude to achieve the desired reactive power output.

The ability to specify the ratio of virtual reactance to virtual resistance within the virtual impedance is useful, as this ratio can affect the stability of the power regulator during and after the grid event. Certain choices of ratio can also restrict the types of analysis that can be reasonably applied to establish confidence in the large-signal stability of the power regulator and broader power system to which the inverter-based resource is connected. Valid application of large-signal stability analysis techniques is of interest, because these techniques can allow for a greater degree of confidence in the large-signal stability of the power regulator loop and the broader power system. Large-signal stability analyses (including ubiquitous Equal Area Criterion method and rigorous Lyapunov-based techniques) for the outer power regulation loops (sometimes referred to as 'primary' control loops) used in grid-forming inverters depend upon the assumption that the grid impedance, including the virtual impedance, is entirely or predominantly reactive with a comparatively small actual and/or virtual resistance.

Furthermore, these analyses are most relevant if, during activation, the step-change in the magnitude of the predominantly-reactive virtual impedance is rapid or instantaneous. Current limitation performance is also best achieved if the activation is rapid or instantaneous. However, rapid or instantaneous activation or deactivation of a mostly- or purely-reactive virtual impedance may result in poor current limitation performance, in the form of undesirable current overshoot. To mitigate this current overshoot, a momentary virtual resistance and fast impedance phase-angle ramp can be implemented while preserving the validity of the aforementioned large-signal stability analyses techniques.

The validity is preserved because principles of time-scale separation can be applied: in the slow timescale that is most relevant to these aforementioned large-signal loss-of-synchronism stability analysis techniques, the network will still appear predominantly reactive in the time period during which the virtual impedance is activated. A temporary variation in phase angle of the virtual impedance, intended to address temporary current overshoots during activation or deactivation of the virtual impedance or during a very rapid change in the grid condition, will thus not have a significant impact on the slow-timescale electromechanical swing dynamics that are of interest in these celebrated large signal stability analysis techniques.

Thus, the present disclosure has the capability to utilize a fixed virtual impedance with any desired reactance-to-resistance ratio (X/R) during the time period in which the virtual impedance is activated, and to execute step-changes in the magnitude of this virtual impedance within a single control cycle without any loss in over-current limiting performance. It should be noted that the stability of the power regulation loop during and after the grid event, as well as the ability to predict the stability of the power regulation loop, can depend upon the phase angle of the virtual impedance, which is one reason why it may be highly desirable to utilize a virtual impedance that contains non-negligible virtual reactance.

It should be further understood that the present disclosure can apply both to grid-forming control methods that use inner current regulation and/or voltage regulation control loops and can also be applied to grid-forming control methods that do not use these inner control loops. Under some circumstances, the present disclosure can also be applied to grid-following control.

Referring now to the drawings, FIG. 4 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 5) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a corrective or control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Referring now to FIG. 5, a simplified, internal view of one embodiment of the nacelle 16 of the wind turbine 10 shown in FIG. 4 is illustrated. As shown, a generator 24 may be disposed within the nacelle 16 and supported atop a bedplate 46. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

The wind turbine 10 may also one or more pitch drive mechanisms 32 communicatively coupled to the wind turbine controller 26, with each pitch adjustment mechanism(s) 32 being configured to rotate a pitch bearing 40 and thus the individual rotor blade(s) 22 about its respective pitch axis 28. In addition, as shown, the wind turbine 10 may include one or more yaw drive mechanisms 42 configured to change the angle of the nacelle 16 relative to the wind (e.g., by engaging a yaw bearing 44 of the wind turbine 10 that is arranged between the nacelle 16 and the tower 12 of the wind turbine 10).

In addition, the wind turbine 10 may also include one or more sensors 66, 68 for monitoring various wind conditions of the wind turbine 10. For example, the incoming wind direction 30, wind speed, or any other suitable wind condition near of the wind turbine 10 may be measured, such as through use of a suitable weather sensor 66. Suitable weather sensors may include, for example, Light Detection and Ranging ("LIDAR") devices, Sonic Detection and Ranging ("SODAR") devices, anemometers, wind vanes, barometers, radar devices (such as Doppler radar devices) or any other sensing device which can provide wind directional information now known or later developed in the art. Still further sensors 68 may be utilized to measure additional operating parameters of the wind turbine 10, such as voltage, current, vibration, etc. as described herein.

Referring now to FIG. 6, a schematic diagram of one embodiment of a wind turbine power system 100 is illustrated in accordance with aspects of the present disclosure. Although the present disclosure will generally be described herein with reference to the system 100 shown in FIG. 6, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 6 and as mentioned, the rotor 18 of the wind turbine 10 (FIG. 4) may, optionally, be coupled to the gearbox 38, which is, in turn, coupled to a generator 102, which may be a doubly fed induction generator (DFIG). As shown, the DFIG 102 may be connected to a stator bus 104. Further, as shown, a power converter 106 may be connected to the DFIG 102 via a rotor bus 108, and to the stator bus 104 via a line side bus 110. As such, the stator bus 104 may provide an output multiphase power (e.g., three-phase power) from a stator of the DFIG 102, and the rotor bus 108 may provide an output multiphase power (e.g., three-phase power) from a rotor of the DFIG 102. The power converter 106 may also include a rotor side converter (RSC) 112 and a line side converter (LSC) 114. The DFIG 102 is coupled via the rotor bus 108 to the rotor side converter 112. Additionally, the RSC 112 is coupled to the LSC 114 via a DC link 116 across which is a DC link capacitor 118. The LSC 114 is, in turn, coupled to the line side bus 110.

The RSC 112 and the LSC 114 may be configured for normal operating mode in a three-phase, pulse width modulation (PWM) arrangement using one or more switching devices, such as insulated gate bipolar transistor (IGBT) switching elements. In addition, the power converter 106 may be coupled to a converter controller 120 in order to control the operation of the rotor side converter 112 and/or the line side converter 114 as described herein. It should be noted that the converter controller 120 may be configured as an interface between the power converter 106 and the turbine controller 26 and may include any number of control devices.

In typical configurations, various line contactors and circuit breakers including, for example, a grid breaker 122 may also be included for isolating the various components as necessary for normal operation of the DFIG 102 during connection to and disconnection from a load, such as the electrical grid 124. For example, a system circuit breaker 126 may couple a system bus 128 to a transformer 130, which may be coupled to the electrical grid 124 via the grid breaker 122. In alternative embodiments, fuses may replace some or all of the circuit breakers.

In operation, alternating current power generated at the DFIG 102 by rotating the rotor 18 is provided to the electrical grid 124 via dual paths defined by the stator bus 104 and the rotor bus 108. On the rotor bus side 108, sinusoidal multi-phase (e.g., three-phase) alternating current (AC) power is provided to the power converter 106. The rotor side power converter 112 converts the AC power provided from the rotor bus 108 into direct current (DC) power and provides the DC power to the DC link 116. As is generally understood, switching elements (e.g., IGBTs) used in the bridge circuits of the rotor side power converter 112 may be modulated to convert the AC power provided from the rotor bus 108 into DC power suitable for the DC link 116.

In addition, the line side converter 114 converts the DC power on the DC link 116 into AC output power suitable for the electrical grid 124. In particular, switching elements (e.g., IGBTs) used in bridge circuits of the line side power converter 114 can be modulated to convert the DC power on the DC link 116 into AC power on the line side bus 110. The AC power from the power converter 106 can be combined with the power from the stator of DFIG 102 to provide multi-phase power (e.g., three-phase power) having a frequency maintained substantially at the frequency of the electrical grid 124 (e.g., 50 Hz or 60 Hz).

Additionally, various circuit breakers and switches, such as grid breaker 122, system breaker 126, stator sync switch 132, converter breaker 134, and line contactor 136 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 106 may receive control signals from, for instance, the local control system 176 via the converter controller 120. The control signals may be based, among other things, on sensed states or operating characteristics of the wind turbine power system 100. Typically, the control signals provide for control of the operation of the power converter 106. For example, feedback in the form of a sensed speed of the DFIG 102 may be used to control the conversion of the output power from the rotor bus 108 to maintain a proper and balanced multi-phase (e.g., three-phase) power supply. Other feedback from other sensors may also be used by the controller(s) 120, 26 to control the power converter 106, including, for example, stator and rotor bus voltages and current feedbacks. Using the various forms of feedback information, switching control signals (e.g., gate timing commands for IGBTs), stator synchronizing control signals, and circuit breaker signals may be generated.

The power converter 106 also compensates or adjusts the frequency of the three-phase power from the rotor for changes, for example, in the wind speed at the hub 20 and the rotor blades 22. Therefore, mechanical and electrical rotor frequencies are decoupled and the electrical stator and rotor frequency matching is facilitated substantially independently of the mechanical rotor speed.

Under some states, the bi-directional characteristics of the power converter 106, and specifically, the bi-directional characteristics of the LSC 114 and RSC 112, facilitate feeding back at least some of the generated electrical power into generator rotor. More specifically, electrical power may be transmitted from the stator bus 104 to the line side bus 110 and subsequently through the line contactor 136 and into the power converter 106, specifically the LSC 114 which acts as a rectifier and rectifies the sinusoidal, three-phase AC power to DC power. The DC power is transmitted into the DC link 116. The capacitor 118 facilitates mitigating DC link voltage amplitude variations by facilitating mitigation of a DC ripple sometimes associated with three-phase AC rectification.

The DC power is subsequently transmitted to the RSC 112 that converts the DC electrical power to a three-phase, sinusoidal AC electrical power by adjusting voltages, currents, and frequencies. This conversion is monitored and controlled via the converter controller 120. The converted AC power is transmitted from the RSC 112 via the rotor bus 108 to the generator rotor. In this manner, generator reactive power control is facilitated by controlling rotor current and voltage.

Referring now to FIG. 7, the wind turbine power system 100 described herein may be part of a wind farm 150. As shown, the wind farm 150 may include a plurality of wind turbines 152, including the wind turbine 10 described above, and an overall farm-level controller 156. For example, as shown in the illustrated embodiment, the wind farm 150 includes twelve wind turbines, including wind turbine 10. However, in other embodiments, the wind farm 150 may include any other number of wind turbines, such as less than twelve wind turbines or greater than twelve wind turbines. In one embodiment, the turbine controllers of the plurality of wind turbines 152 are communicatively coupled to the farm-level controller 156, e.g., through a wired connection, such as by connecting the turbine controller 26 through suitable communicative links 154 (e.g., a suitable cable). Alternatively, the turbine controllers may be communicatively coupled to the farm-level controller 156 through a wireless connection, such as by using any suitable wireless communications protocol known in the art. In further embodiments, the farm-level controller 156 is configured to send and receive control signals to and from the various wind turbines 152, such as for example, distributing real and/or reactive power demands across the wind turbines 152 of the wind farm 150.

Referring now to FIG. 8, a block diagram of one embodiment of suitable components that may be included within the controller (such as any one of the turbine controller 26, the converter controller 120, and/or the farm-level controller 156 described herein) in accordance with example aspects of the present disclosure is illustrated. As shown, the controller may include one or more processor(s) 158, computer, or other suitable processing unit and associated memory device(s) 160 that may include suitable computer-readable instructions that, when implemented, configure the controller to perform various different functions, such as receiving, transmitting and/or executing wind turbine control signals (e.g., performing the methods, steps, calculations, and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 160 may generally be configured to store suitable computer-readable instructions that, when implemented by the processor(s) 158, configure the controller to perform various functions as described herein. Additionally, the controller may also include a communications interface 162 to facilitate communications between the controller and the various components of the wind turbine 10. An interface can include one or more circuits, terminals, pins, contacts, conductors, or other components for sending and receiving control signals. Moreover, the controller may include a sensor interface 164 (e.g., one or more analog-to-digital converters) to permit signals transmitted from the sensors 66, 68 to be converted into signals that can be understood and processed by the processor(s) 58.

Referring now to FIG. 9, a schematic diagram of one embodiment of a system 200 for providing grid-forming control of a double-fed generator of a wind turbine according to the present disclosure is illustrated. More specifically, as shown, the system 200 may include many of the same features of FIG. 6 described herein, with components having the same reference characters representing like components. Further, as shown, the system 200 may include a control structure for controlling the line-side converter that is similar to the control structure shown in FIG. 6.

Moreover, as shown, the line-side converter control structure may include a DC regulator 212 and a line current regulator 214. The DC regulator 212 is configured to generate line-side current commands for the line current regulator 214. The line current regulator 214 then generates line-side voltage commands for a modulator 218. The modulator 218 also receives an output (e.g., a phase-locked loop angle) from a phase-locked loop 216 to generate one or more gate pulses for the line-side converter 114. The phase-locked loop 216 typically generates its output using a voltage feedback signal.

Furthermore, as shown, the system 200 may also include a control structure for controlling the rotor-side converter 112 using grid-forming characteristics. In particular, as shown in FIG. 9, the system 200 may include a stator voltage regulator 206 for providing such grid-forming characteristics. In addition, as shown, the system 200 may include a grid voltage/VAR regulator 202, an inertial power regulator 204, a virtual impedance module 205, a rotor current regulator 208, and a modulator 210.

In an embodiment, the grid volt/VAR regulator 202 receives a voltage reference (e.g., VT_REF) from the farm-level controller 156 and generates a stator voltage magnitude command (e.g., VS_Mag_Cmd), whereas the inertial power regulator receives a power reference from the turbine controller 26 and generates a stator voltage angle command (e.g., VS_Angle_Cmd). More specifically, in an embodiment, as shown, the stator voltage regulator 206 determines one or more rotor current commands (e.g., IRCmdy and IRCmdx) as a function of the stator voltage magnitude command, the stator voltage angle command, and/or a stator current feedback signal 240 of the double-fed generator 120. It should be understood that the stator feedback current 240 is a strong indicator of the characteristics of the externally connected power system, i.e., the grid. Therefore, the stator feedback current 240 can be used as a feedback signal to decouple the response of stator voltage to variations to the nature of the grid. Further details relating to the stator voltage regulator 206 are further explained and described in PCT/US2020/013787 entitled "System and Method for Providing Grid-Forming Control for a Doubly-Feb Wind Turbine Generator," which is incorporated herein by reference in its entirety.

As mentioned, with grid-forming control, current changes rapidly when there are grid disturbances. Further, the control action is gradual to restore the steady-state operating conditions commanded by higher-level controls. The amount of current change is inversely related to the total impedance of the circuit. However, if the current exceeds limits, then the control responds rapidly to force the current to be within limits. This drastic nonlinearity can cause chaotic behavior when applied to a grid consisting of many other similar systems. Alternatively, if the current change is too small, then the grid-forming system will not contribute as much as it could to support the grid.

Therefore, the present disclosure is directed to a system and method for controlling an inverter-based resource connected to a power grid during a severe grid event and/or an islanding event. Thus, the present disclosure addresses various overload conditions, i.e., overcurrent, overpower, and/or over-energy conditions that a grid-forming IBR may easily experience during an unexpected and severe grid disturbance when grid-tied, i.e., connected to the bulk power system, or when operating in parallel with other sources or loads in an islanded power grid or microgrid setting. Overcurrent, overpower, and over-energy conditions may manifest as the result of a severe grid event. As used herein, a severe grid event may generally refer, but is not limited to, severe instances of the following: (1) symmetric or asymmetric line-to-ground or line-to-line fault when islanded or grid-tied, with the fault being local to the inverter or electrically distant, (2) a step-up or step-down or sag or swell in the utility grid voltage magnitude, when grid-tied, (3) a step-up or step-down in the utility grid phase angle, when grid-tied, (4) loss of a distribution or transmission line when islanded or grid-tied, (5) unexpected loss of another significant grid-forming source when islanded or grid-tied, (6) large steps in constant-power load, constant current load, constant impedance load, or machine load, or large steps in a composite that includes of any of these aforementioned load types, when islanded or grid-tied, and/or (7) large steps in load associated with an unintentional islanding event, i.e. an unintentional transition from grid-tied to islanded condition, as well as any other severe grid events now or later known in the art. Further, a severe grid event can also manifest as a combination of two or more of the event types listed above, including combinations of severe grid events that happen simultaneously or combinations of severe grid events that occur in a consecutive manner within a short time period.

Referring now to FIG. 10, a flow diagram of one embodiment of such a method 300 for controlling an inverter-based resource connected to a power grid during a severe grid event according to the present disclosure is illustrated. It should be appreciated that the disclosed method 300 may be implemented with any suitable inverter-based resource having any suitable configuration. In several embodiments, for example, the inverter-based resource may be a wind turbine power system (e.g., having a full conversion power system or a dual-fed power conversion system as illustrated in FIG. 9, or dual-fed systems that regulate voltage at some other location instead of the stator, or that dual-fed systems that regulate magnetic flux or dual-fed systems that regulate the grid or stator voltage using the line-side inverter instead of the rotor-side inverter), a solar inverter, an energy storage system, a STATCOM, a hydro-power system, or any other inverter-based system mentioned herein or known in the art. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (302), the method 300 includes operating, via a controller, the inverter-based resource based on a first virtual impedance reference prior to the grid event. In such embodiments, the first virtual impedance reference can be used by the controller for determining a first virtual impedance of the inverter-based resource defining a first virtual reactance and a first virtual resistance. As shown at (304), the method 300 includes receiving, via a controller, an indication of a start of the grid event, such as a severe grid event as described herein, that causes a change, such as step change, in the first virtual impedance reference to a second virtual impedance reference. Immediately after the change in the first virtual impedance reference, as shown at (306), the method 300 includes activating, via the controller, a soft activation module for outputting a second virtual impedance defining a second virtual reactance and a second virtual resistance that maintains a magnitude of the second virtual impedance at or above a magnitude of the second virtual impedance reference so as to reduce current in the inverter-based resource.

As used herein, a "virtual" impedance value generally refers to impedance behavior that can be mimicked by a system, rather than the impedance being provided by a particular component (such as an inductor). Thus, the virtual impedance can be a fixed value determined by studies of the application scenario. Alternatively, the virtual impedance may be variable, e.g., as determined by a control logic that adapts to measured grid conditions. Thus, as shown in FIG. 9, the virtual impedance may be determined by and implemented into the system by the virtual impedance module 205. In one embodiment, as an example, a larger effective impedance can be used to reduce the extreme nonlinearity associated with the rapid rise into the current limiting region, e.g., during a grid fault. Thus, upon fault clearing, the larger virtual impedance allows for inrush current to be within limits. After the grid fault, the virtual impedance may then be lowered as grid voltage recovers so that the converter contributes to supporting the grid while operating within its linear region. In addition, in an embodiment, a lower effective impedance can be used to improve the support provided to the grid for milder events.

Still referring to FIG. 10, as shown at (308), at a certain time period after activating the soft activation module, the method 300 includes transitioning, via the controller, the second virtual reactance and the second virtual resistance to a virtual reactance and a virtual resistance defined by the change. Moreover, as shown at (310), the method 300 optionally includes deactivating, via the controller, the virtual impedance of the inverter-based resource at a certain time period after activating the soft activation module.

For example, as shown in FIG. 11, a flow diagram of another embodiment of a method 450 for controlling an inverter-based resource connected to a power grid during a severe grid event according to the present disclosure is illustrated. It should be appreciated that the disclosed method 450 may be implemented with any suitable inverter-based resource having any suitable configuration. In several embodiments, for example, the inverter-based resource may be a wind turbine power system (e.g., having a full conversion power system or a dual-fed power conversion system as illustrated in FIG. 11, or dual-fed systems that regulate voltage at some other location instead of the stator, or that dual-fed systems that regulate magnetic flux), a solar inverter, an energy storage system, a STATCOM, a hydropower system, or any other inverter-based system mentioned herein or known in the art. In addition, although FIG. 11 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (452), the method 450 includes operating, via a controller, the inverter-based resource based on a virtual impedance reference during the grid event. The first virtual impedance reference is used by the controller for determining a virtual impedance of the inverter-based resource defining a virtual reactance and a virtual resistance. As shown at (454), the method 450 includes receiving, via the controller, a signal indicating that the virtual impedance can be deactivated due to the grid event being over. In response to receiving the signal, as shown at (456), the method 450 includes applying, via the controller, activating a soft deactivation module. Thus, in such embodiments, as shown at (458), activating the soft deactivation module includes determining a voltage drop across the virtual impedance. Further, as shown at (460), activating the soft deactivation module includes superimposing the voltage drop upon a voltage reference of the inverter-based resource simultaneously with deactivating the virtual impedance.

The present disclosure can be better understood with reference to FIGS. 12 and 13. More specifically, FIGS. 12 and 13 provide an embodiment of a control scheme that utilizes a synchronously-rotating reference frame according to the present disclosure. In particular, FIG. 12 illustrates a schematic diagram of an embodiment of a soft activation module 400 of the control scheme according to the present disclosure, whereas FIG. 13 illustrates a schematic diagram of an embodiment of a soft deactivation module 500 control scheme according to the present disclosure.

In an embodiment, the present disclosure provides an overload detection function that outputs an overload signal that is nominally zero, but is equal to one (1) whenever one or more monitored variables of interest (e.g., current, active power, or energy) equals or exceeds a specified variable-specific threshold. More specifically, as shown in FIG. 13, an activation signal 502 (e.g., VI_Activate) that is nominally zero but which steps to one (1) once an overload signal is equal to one (1) is received by the control scheme. This activation signal 502 remains high until reset by an external control function. Thus, the activation signal 502 is used to ensure that the virtual impedance stays activated through the duration of the event, until a decision is made by an external control function to deactivate the virtual impedance.

Moreover, as shown in FIGS. 12 and 13, $i_{abc}$ represents the instantaneous three-phase current 402 measured at terminals of the inverter-based resource, $V_{ab}$, is the three-phase instantaneous voltage reference 504 not including the voltage offset introduced by the virtual impedance, and $V_{abc,vi}$ is the three-phase instantaneous voltage reference 506 including the voltage offset introduced by the virtual impedance. Further, in such embodiments, a virtual impedance 404 (Rv+j*Xv) output by the soft activation module 400 may be multiplied by the dq-transformed inverter current 406, $i_{dq}$, in order to generate the desired voltage drop 408 in the d- and q-axes, respectively. In particular, in FIG. 12, the virtual impedance voltage drop 408 is denoted by $V_v = V_{vd} + j*V_{vq}$.

When activated, the voltage drop $V_v$ is summed with a dq-transformed $V_{abc}$ 504 to produce $V_{abc,vi}$ 506, which is then used as the voltage reference for the inverter-based resource. $V_{abc,vi}$ 506 can be set as the voltage reference of the voltage regulation loop, which in turn may optionally provide a reference for an inner current regulation loop.

Alternatively, $V_{abc,vi}$ can be used directly as the instantaneous three-phase reference (or modulation indices) for the pulse-width-modulation functions within grid-forming or grid-following inverter controllers, in which case the fundamental harmonic of the voltage at the terminals of the inverter-based resource will closely match $V_{abc,vi}$. As shown in the embodiment in FIGS. 12 and 13, a synchronously-rotating reference frame can be used for the calculations used to superimpose any virtual impedance voltage drops upon the original voltage reference $V_{abc}$. The synchronously-rotating reference frame can rotate synchronously with the frequency commanded by a grid-forming inverter, or with a static or dynamic estimate of the system frequency. Alternative stationary reference frame or phasor-domain approaches may also be used to superimpose any virtual impedance voltage drops upon the virtual impedance reference.

Thus, referring particularly to FIG. 12, the soft activation module 400 outputs the virtual impedance 404 to be used to calculate the voltage drop $V_v$ that is superimposed upon the instantaneous inverter voltage reference. Moreover, as shown, the soft activation module 400 receives as an input a pre-specified virtual impedance reference 410. In certain embodiments, the virtual impedance reference 410 may be a fixed value based on experience and/or historical data. In other embodiments, the virtual impedance reference 410 may be an adaptive value based on specific situations such as different events, current limiting requirements, coordination for purpose of stability, and the like.

Moreover, as shown in the embodiment of FIG. 12, for example, the virtual impedance reference 410 may be defined by a combination of a virtual resistance reference Rv* 412 and a virtual reactance reference Xv* 414. In addition, as shown, the virtual reactance reference 414 can optionally be defined as the product of virtual inductance reference Lv* 416 and a frequency value (omega) 418. In such embodiments, the frequency value can represent the frequency commanded by a grid-forming inverter, or a static or dynamic estimate of the system frequency. In other embodiments, the virtual impedance 404 may be defined as a reference magnitude 420 and reference phase angle 422. It is assumed that the magnitude of the virtual impedance (in per-unit or Ohms) can be predetermined and set by a local or system-level controller. The virtual impedance reference magnitude may be selected to be sufficiently large enough to limit the current for one or more considered grid event. Furthermore, it is sometimes desirable to select a particular reference phase to ensure predictable and stable behavior of the inverter during and after an event.

Still referring to FIG. 12, the soft activation module 400 may be configured to calculate the reference magnitude 420 and reference phase angle 422 of the virtual impedance reference 410 using a rectangular to polar conversion function 424. In other embodiments, if the reference magnitude 420 and reference phase angle 422 are already provided to the soft activation module 400, the rectangular-to-polar conversion function 424 may be omitted.

In addition, as shown, the soft activation module 400 may include a means by which to adjust the phase angle of the virtual impedance transiently upon initial activation of the virtual impedance or during sudden changes in grid condition. In the embodiment shown in FIG. 12, for example, the soft activation module 400 includes a triggered integrator function 426 with saturation. In such embodiments, the triggered integrator function 426 is configured, when triggered, to ensure that the phase angle of the virtual impedance is set (or reset) to a pre-specified starting value immediately after the trigger signal is received. In particular, in an embodiment, the triggered integrator function 426 may ensure the virtual impedance is at zero or close to zero: i.e., the virtual impedance is purely or mostly resistive. In such embodiments, a starting value of zero or near zero is useful as it helps to ensure that there is no current overshoot. In addition, the triggered integrator function 426 is provided a saturation value such that the output of the triggered integrator function 426 is limited to this value. In certain embodiments, the reference phase angle of the virtual impedance is provided as the saturation value.

Once triggered, the triggered integrator function 426 then starts to ramp the phase angle of the virtual impedance to its nominal value. More specifically, as shown, a pre-specified phase ramp rate value 428 is provided to the triggered integrator function 426, which determines the rate at which the phase angle is ramped from zero to the desired reference angle upon being triggered. As an example, the triggered integrator function 426 may reach the desired reference angle within a time span of approximately 10 milliseconds (ms).

In addition, as shown, a "Ramp Activate" signal 430 may be provided to the soft activation module 400, which is connected the trigger input of the triggered integrator function 426. In such embodiments, the Ramp Activate signal 430 may be a discrete signal, having values of 0 or 1. Thus, when the Ramp Activate signal 430 rises from 0 to 1, the triggered integrator function 426 is triggered to set or reset its output value and then immediately thereafter commence its ramping. The Ramp Activate signal 430 may also pulse briefly from 0 to 1 during a rising edge of the overload signal.

Still referring to FIG. 12, the soft activation module 400 may include a polar-to-rectangular block 432 is included in the soft activation module 400 for converting a received magnitude and phase angle to rectangular coordinates. In particular, as shown, the polar-to-rectangular block 432 receives the virtual impedance reference magnitude 420 in its magnitude input and the phase angle output 434 of the triggered integrator function 426 as its phase input. Thus, as shown, the output of the polar-to-rectangular block 432 is Rv+j*Xv, which is the virtual impedance applied in the current limiting control.

Referring particularly to FIG. 13, the soft deactivation module 500 is configured to determine whether or not the voltage drop $V_v$ will in fact be superimposed upon the original voltage reference, and whether or not an additional offset will be applied. Thus, as shown, the inputs to the soft deactivation module 500 include the virtual impedance voltage drop $V_v$ calculated in FIG. 12.

Accordingly, the soft deactivation module 500 ensures that once the virtual impedance 404 is activated for purposes of overload ride-through, the virtual impedance 404 is maintained at a fixed magnitude throughout the duration of the event, until VI_Activate falls from 1 to zero upon which the virtual impedance 404 is removed. This is accomplished by applying the aforementioned VI_Activate signal 502 to the control port of a switch module 508 included within the soft deactivation module 500. In particular, as shown, the switch module 508 determines whether the virtual impedance voltage drop $V_v$ 408 will be subtracted from the original voltage reference ($V_{abc}$) or whether no voltage will be subtracted from the original voltage reference.

Moreover, as shown, the soft deactivation module 500 is configured to store the value of the virtual impedance voltage drop $V_v$ 408 at the last controller time step. In the embodiment shown in FIG. 13, for example, this is demonstrated in the application of memory blocks 510, 512 to $\Delta V_{vd}$ and $\Delta V_{vq}$. In such embodiments, the input of each of the memory blocks 510, 512 is the voltage value at timestep k, and the output is the voltage value at timestep k-1.

To achieve soft deactivation of the virtual impedance once the grid event is over, the phase angle across the virtual impedance is measured and added to the inverter-based resource at the same instance that the virtual impedance is removed. Additionally, at the same instance, a voltage magnitude offset is added to the inverter voltage regulator: this offset is equal to the magnitude of the complex voltage across the virtual reactance just prior to the removal of the virtual impedance. In one possible embodiment shown in FIG. 13, the aforementioned soft deactivation is accomplished using a triggered subsystem 514. In such embodiments, the d- and q-axis virtual impedance voltage offset 516 from the previous controller timestep (k-1) outputted by the memory blocks 510, 512 serve as inputs to the triggered subsystem 514. The Zero Order Hold (ZOH) blocks 518, 520 within the triggered subsystem 514 capture the d- and q-axis voltages offsets only when the subsystem 514 is triggered. Thus, in an embodiment, the subsystem 514 is triggered by a falling edge of the VI_Activate signal 502. The d- and q-voltage offsets outputted by the ZOH 518, 520 include the aforementioned virtual impedance magnitude and phase angle information. The ZOH blocks 518, 520 can then provide this same fixed offset in phase angle and magnitude for as long as the inverter continues to operate. In case a subsequent severe grid event occurs that triggers the virtual-impedance-based fault current limiting, a new triggered subsystem is realized, including additional ZOH blocks that will provide an additional voltage offset once the subsequent event is over. As a result of this smooth deactivation, after the grid event is over, the inverter-based resource can smoothly ramp its active power to any desired value set by a (possibly modified) active power reference at a rate determined by the power regulation control bandwidth.

Once the VI_Activate signal 502 falls from 1 to 0, during or after the ramping of the active power output back to the desired value, an outer voltage regulation loop can then be employed to smoothly restore the terminal voltage magnitude to its nominal value, in order to achieve the desired reactive power output.

Accordingly, the present disclosure ensures that there is no phase angle or voltage magnitude disturbance at the terminals of the inverter-based resource during the deactivation of the virtual impedance. A secondary voltage regulator can then be used to gradually increase the reference of the voltage regulator to return it to a nominal value. Moreover, it should be noted that the stability of the power regulation loop during and after the grid event can depend upon the phase angle of the virtual impedance, which is one reason why it may be highly desirable to utilize a virtual impedance that contains non-negligible virtual reactance. A momentary 'pure virtual resistance' and subsequent fast phase-angle ramp can be implemented at the beginning of the event (e.g., the first 10 ms or so) without jeopardizing the stability of the power regulation loop. This is because the power regulation loop is an outer regulation loop and principles of time-scale separation can be applied. In the slow timescale that is most relevant to power regulation loop stability analysis, the network will still appear reactive throughout the majority of the grid event.

Various aspects and embodiments of the present invention are defined by the following numbered clauses:

1. A method for controlling an inverter-based resource connected to a power grid during a grid event, the method comprising:
   operating, via a controller, the inverter-based resource based on a first virtual impedance reference prior to the grid event, the first virtual impedance reference being used by the controller for determining a first virtual impedance of the inverter-based resource defining a first virtual reactance and a first virtual resistance;
   receiving, via the controller, an indication of a start of the grid event that causes a change in the first virtual impedance reference to a second virtual impedance reference;
   immediately after the change in the first virtual impedance reference, activating a soft activation module for outputting a second virtual impedance defining a second virtual reactance and a second virtual resistance that maintains a magnitude of the second virtual impedance at or above a magnitude of the second virtual impedance reference so as to reduce current in the inverter-based resource; and
   at a certain time period after activating the soft activation module, transitioning, via the controller, the second virtual reactance and the second virtual resistance to a virtual reactance and a virtual resistance defined by the change.

2. The method of clause 1, wherein the first virtual impedance and the second virtual impedance each define a set of at least one of a magnitude and phase angle or resistive and reactive components, and wherein the first virtual impedance reference and the second virtual impedance reference each define at least one of a set of a reference magnitude and a reference phase angle or a virtual resistance reference and a virtual reactance reference.

3. The method of clause 2, further comprising determining the virtual reactance reference as a product of a virtual inductance reference and a frequency value, the frequency value being one of a frequency commanded by the inverter-based resource or a static or dynamic estimate of a system frequency.

4. The method of clauses 2-3, wherein activating the soft activation module further comprises:
   determining the magnitude and the phase angle of the second virtual impedance from the reference magnitude and the reference phase angle of the virtual impedance reference after the change using a rectangular-to-polar conversion function.

5. The method of clauses 2-4, wherein activating the soft activation module further comprises:
   transiently adjusting the phase angle of the second virtual impedance via a triggered integrator function with saturation.

6. The method of clause 5, wherein transiently adjusting the phase angle of the second virtual impedance via the triggered integrator function with saturation further comprises:
   ensuring that the phase angle of the second virtual impedance is set or reset to a pre-specified starting value immediately after a trigger signal is received by the triggered integrator to avoid current overshoot; and
   once the trigger signal is received, starting, via the triggered integrator, to ramp the phase angle of the second virtual impedance to the nominal value.

7. The method of clause 6, wherein activating the soft activation module further comprises:
   receiving, via a polar-to-rectangular block of the controller, the magnitude and the nominal value of the phase angle of the second virtual impedance; and converting the magnitude and the nominal value of the phase angle to rectangular coordinates to determine the second virtual impedance.

8. The method of any of the preceding clauses, further comprising, once the grid event is over, ramping up active power of the inverter-based resource to a desired value at a rate determined by a power regulation control bandwidth.

9. The method of clause 8, further comprising employing an outer voltage regulation loop to restore a terminal voltage magnitude to achieve a desired reactive power output of the inverter-based resource.

10. The method of any of the preceding clauses, further comprising applying, via the controller, a deactivation module at a certain time period after activating the soft activation module.

11. The method of clause 10, further comprising ensuring that once the soft activation module is activated, the magnitude of the second virtual impedance is maintained at or above the magnitude of the second virtual impedance reference so as to reduce current oscillations in the power grid for a duration of the grid event, wherein ensuring that once the soft activation module is activated, the magnitude of the second virtual impedance is maintained at or above the magnitude of the second virtual impedance reference further comprises:
   receiving, via the controller, an activation signal; and
   determining whether or not to subtract a voltage drop from a voltage reference of the inverter-based resource.

12. A method for controlling an inverter-based resource connected to a power grid during a grid event, the method comprising:
   operating, via a controller, the inverter-based resource based on a virtual impedance reference during the grid event, the virtual impedance reference being used by the controller for determining a virtual impedance of the inverter-based resource defining a virtual reactance and a virtual resistance;
   receiving, via the controller, a signal indicating that the virtual impedance can be deactivated due to the grid event being over;
   in response to receiving the signal, applying, via the controller, activating a soft deactivation module, wherein activating the soft deactivation module further comprises:
      determining a voltage drop across the virtual impedance; and
      superimposing the voltage drop upon a voltage reference of the inverter-based resource simultaneously with deactivating the virtual impedance.

13. The method of clause 12, wherein activating the soft deactivation module further comprises:
   providing d- and q-axis virtual impedance voltage offsets to a voltage regulator of the inverter-based resource simultaneously with activating the soft deactivation module for as long as the inverter-based resource continues to operate, the d- and q-axis virtual impedance voltage offsets comprising one of a set of a magnitude and a phase angle or a set of two rectangular coordinates.

14. A system for controlling an inverter-based resource connected to a power grid during a grid event, the system comprising:
a controller comprising at least one processor, the at least one processor configured to perform a plurality of operations, the plurality of operations comprising:
operating the inverter-based resource based on a first virtual impedance reference prior to the grid event, the first virtual impedance reference being used by the controller for determining a first virtual impedance of the inverter-based resource defining a first virtual reactance and a first virtual resistance;
receiving an indication of a start of the grid event that causes a change in the first virtual impedance reference to a second virtual impedance reference;
immediately after the change in the first virtual impedance reference, activating a soft activation module for outputting a second virtual impedance defining a second virtual reactance and a second virtual resistance that maintains a magnitude of the second virtual impedance at or above a magnitude of the second virtual impedance reference so as to reduce current in the inverter-based resource; and
at a certain time period after activating the soft activation module, transitioning, via the controller, the second virtual reactance and the second virtual resistance to a virtual reactance and a virtual resistance defined by the change.

15. The system of clause 14, wherein the first virtual impedance and the second virtual impedance each define a set of at least one of a magnitude and phase angle or resistive and reactive components, and wherein the first virtual impedance reference and the second virtual impedance reference each define at least one of a set of a reference magnitude and a reference phase angle or a virtual resistance reference and a virtual reactance reference.

16. The system of clause 15, wherein the plurality of operations further comprise:
determining the virtual reactance reference as a product of a virtual inductance reference and a frequency value, the frequency value being one of a frequency commanded by the inverter-based resource or a static or dynamic estimate of a system frequency.

17. The system of clauses 15-16, wherein activating the soft activation module further comprises:
determining the magnitude and the phase angle of the second virtual impedance from the reference magnitude and the reference phase angle of the virtual impedance reference after the change using a rectangular-to-polar conversion function; and
transiently adjusting the phase angle of the second virtual impedance via a triggered integrator function with saturation.

18. The system of clause 17, wherein transiently adjusting the phase angle of the second virtual impedance via the triggered integrator function with saturation further comprises:
ensuring that the phase angle of the second virtual impedance is set or reset to a pre-specified starting value immediately after a trigger signal is received by the triggered integrator to avoid current overshoot; and
once the trigger signal is received, starting, via the triggered integrator, to ramp the phase angle of the second virtual impedance to the nominal value.

19. The system of clause 18, wherein activating the soft activation module further comprises:

receiving, via a polar-to-rectangular block of the controller, the magnitude and the nominal value of the phase angle of the second virtual impedance; and
converting the magnitude and the nominal value of the phase angle to rectangular coordinates to determine the second virtual impedance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling an inverter-based resource connected to a power grid during a grid event, the method comprising:
operating, via a controller, the inverter-based resource based on a first virtual impedance reference prior to the grid event, the first virtual impedance reference being used by the controller for determining a first virtual impedance of the inverter-based resource defining a first virtual reactance and a first virtual resistance;
receiving, via the controller, an indication of a start of the grid event that causes a change in the first virtual impedance reference to a second virtual impedance reference that is larger than the first virtual impedance reference;
immediately after the change in the first virtual impedance reference, activating a soft activation module for outputting a second virtual impedance defining a second virtual reactance and a second virtual resistance that maintains a magnitude of the second virtual impedance at or above a magnitude of the second virtual impedance reference so as to reduce current in the inverter-based resource;
at a certain time period after activating the soft activation module, transitioning, via the controller, the second virtual reactance and the second virtual resistance to a virtual reactance and a virtual resistance defined by the change; and
ensuring that once the soft activation module is activated, the magnitude of the second virtual impedance is maintained at or above the magnitude of the second virtual impedance reference so as to reduce current oscillations in the power grid for a duration of the grid event, wherein ensuring that once the soft activation module is activated, the magnitude of the second virtual impedance is maintained at or above the magnitude of the second virtual impedance reference further comprises:
receiving, via the controller, an activation signal; and
determining whether or not to subtract a voltage drop from a voltage reference of the inverter-based resource.

2. The method of claim 1, further comprising applying, via the controller, a deactivation module at a certain time period after activating the soft activation module.

3. The method of claim 1, further comprising, once the grid event is over, ramping up active power of the inverter-based resource to a desired value at a rate determined by a power regulation control bandwidth.

4. The method of claim 3, further comprising employing an outer voltage regulation loop to restore a terminal voltage magnitude to achieve a desired reactive power output of the inverter-based resource.

5. The method of claim 1, wherein the first virtual impedance and the second virtual impedance each define a set of at least one of a magnitude and phase angle or resistive and reactive components, and wherein the first virtual impedance reference and the second virtual impedance reference each define at least one of a set of a reference magnitude and a reference phase angle or a virtual resistance reference and a virtual reactance reference.

6. The method of claim 5, further comprising determining the virtual reactance reference as a product of a virtual inductance reference and a frequency value, the frequency value being one of a frequency commanded by the inverter-based resource or a static or dynamic estimate of a system frequency.

7. The method of claim 5, wherein activating the soft activation module further comprises:
determining the magnitude and the phase angle of the second virtual impedance from the reference magnitude and the reference phase angle of the virtual impedance reference after the change using a rectangular-to-polar conversion function.

8. The method of claim 5, wherein activating the soft activation module further comprises:
transiently adjusting the phase angle of the second virtual impedance via a triggered integrator function with saturation.

9. The method of claim 8, wherein transiently adjusting the phase angle of the second virtual impedance via the triggered integrator function with saturation further comprises:
ensuring that the phase angle of the second virtual impedance is set or reset to a pre-specified starting value immediately after a trigger signal is received by the triggered integrator to avoid current overshoot; and
once the trigger signal is received, starting, via the triggered integrator, to ramp the phase angle of the second virtual impedance to the nominal value.

10. The method of claim 9, wherein activating the soft activation module further comprises:
receiving, via a polar-to-rectangular block of the controller, the magnitude and the nominal value of the phase angle of the second virtual impedance; and
converting the magnitude and the nominal value of the phase angle to rectangular coordinates to determine the second virtual impedance.

11. A method for controlling an inverter-based resource connected to a power grid during a grid event, the method comprising:
operating, via a controller, the inverter-based resource based on a virtual impedance reference during the grid event, the virtual impedance reference being used by the controller for determining a virtual impedance of the inverter-based resource defining a virtual reactance and a virtual resistance;
ensuring that a magnitude of the virtual impedance is maintained at or above a magnitude of the virtual impedance reference so as to reduce current oscillations in the power grid for a duration of the grid event;
receiving, via the controller, a signal indicating that the virtual impedance can be deactivated due to the grid event being over;
in response to receiving the signal, activating, via the controller, a soft deactivation module, wherein activating the soft deactivation module further comprises:
determining a voltage drop across the virtual impedance; and
superimposing the voltage drop upon a voltage reference of the inverter-based resource simultaneously with deactivating the virtual impedance, wherein ensuring that the magnitude of the virtual impedance is maintained at or above the magnitude of the virtual impedance reference further comprises receiving an activation signal and determining whether or not to subtract a voltage drop from a voltage reference of the inverter-based resource.

12. The method of claim 11, wherein activating the soft deactivation module further comprises:
providing d- and q-axis virtual impedance voltage offsets to a voltage regulator of the inverter-based resource simultaneously with activating the soft deactivation module for as long as the inverter-based resource continues to operate, the d- and q-axis virtual impedance voltage offsets comprising one of a set of a magnitude and a phase angle or a set of two rectangular coordinates.

13. A system for controlling an inverter-based resource connected to a power grid during a grid event, the system comprising:
a controller comprising at least one processor, the at least one processor configured to perform a plurality of operations, the plurality of operations comprising:
operating the inverter-based resource based on a first virtual impedance reference prior to the grid event, the first virtual impedance reference being used by the controller for determining a first virtual impedance of the inverter-based resource defining a first virtual reactance and first virtual resistance;
receiving an indication of a start of the grid event that causes a change in the first virtual impedance reference to a second virtual impedance reference that is larger than the first virtual impedance reference;
immediately after the change in the first virtual impedance reference, activating a soft activation module for outputting a second virtual impedance defining a second virtual reactance and a second virtual resistance that maintains a magnitude of the second virtual impedance at or above a magnitude of the second virtual impedance reference so as to reduce current in the inverter-based resource; and
at a certain time period after activating the soft activation module, transitioning, via the controller, the second virtual reactance and the second virtual resistance to a virtual reactance and a virtual resistance defined by the change; and
ensuring that once the soft activation module is activated, the magnitude of the second virtual impedance is maintained at or above the magnitude of the second virtual impedance reference so as to reduce current oscillations in the power grid for a duration of the grid event, wherein ensuring that once the soft activation module is activated, the magnitude of the second virtual impedance is maintained at or above the magnitude of the second virtual impedance reference further comprises:
receiving, via the controller, an activation signal; and
determining whether or not to subtract a voltage drop from a voltage reference of the inverter-based resource.

14. The system of claim 13, wherein the plurality of operations further comprise:
   determining the virtual reactance reference as a product of a virtual inductance reference and a frequency value, the frequency value being one of a frequency commanded by the inverter-based resource or a static or dynamic estimate of a system frequency.

15. The system of claim 13, wherein the first virtual impedance and the second virtual impedance each define a set of at least one of a magnitude and phase angle or resistive and reactive components, and wherein the first virtual impedance reference and the second virtual impedance reference each define at least one of a set of a reference magnitude and a reference phase angle or a virtual resistance reference and a virtual reactance reference.

16. The system of claim 15, wherein activating the soft activation module further comprises:
   determining the magnitude and the phase angle of the second virtual impedance from the reference magnitude and the reference phase angle of the virtual impedance reference after the change using a rectangular-to-polar conversion function; and
   transiently adjusting the phase angle of the second virtual impedance via a triggered integrator function with saturation.

17. The system of claim 16, wherein transiently adjusting the phase angle of the second virtual impedance via the triggered integrator function with saturation further comprises:
   ensuring that the phase angle of the second virtual impedance is set or reset to a pre-specified starting value immediately after a trigger signal is received by the triggered integrator to avoid current overshoot; and
   once the trigger signal is received, starting, via the triggered integrator, to ramp the phase angle of the second virtual impedance to the nominal value.

18. The system of claim 17, wherein activating the soft activation module further comprises:
   receiving, via a polar-to-rectangular block of the controller, the magnitude and the nominal value of the phase angle of the second virtual impedance; and
   converting the magnitude and the nominal value of the phase angle to rectangular coordinates to determine the second virtual impedance.

\* \* \* \* \*